United States Patent
Cornman et al.

(10) Patent No.: US 6,307,500 B1
(45) Date of Patent: Oct. 23, 2001

(54) METHOD OF MOMENT ESTIMATION AND FEATURE EXTRACTION FOR DEVICES WHICH MEASURE SPECTRA AS A FUNCTION OF RANGE OR TIME

(75) Inventors: Lawrence Bruce Cornman, Longmont; Corinne Sue Morse, Hygiene; Robert Kent Goodrich, Boulder, all of CO (US)

(73) Assignee: University Corporation for Atmospheric Research, Boulder, CO (US)

( * ) Notice: Subject to any disclaimer, the term of this patent is extended or adjusted under 35 U.S.C. 154(b) by 0 days.

(21) Appl. No.: 09/373,663

(22) Filed: Aug. 13, 1999

(51) Int. Cl.$^7$ ................................................... G01S 13/95
(52) U.S. Cl. ............................ 342/26; 342/192; 342/196; 702/3
(58) Field of Search .............................. 342/26, 192, 193, 342/195, 196, 460; 702/3; 382/156

(56) References Cited

U.S. PATENT DOCUMENTS

| | | | |
|---|---|---|---|
| 5,648,782 | * 7/1997 | Albo et al. | 342/26 |
| 5,796,611 | * 8/1998 | Ochiai et al. | 364/420 |
| 5,940,523 | * 8/1999 | Cornman et al. | 382/100 |
| 5,949,367 | * 9/1999 | Trompf et al. | 342/90 |
| 5,973,635 | * 10/1999 | Albo | 342/26 |
| 6,035,057 | * 3/2000 | Hoffman | 382/159 |

FOREIGN PATENT DOCUMENTS

09145851A * 6/1997 (JP).

OTHER PUBLICATIONS

"Detection of anomalous propagation echoes in weather radar data using neural networks", Grecu, M.; Krajewski, W.F., Geoscience and Remote Sensing, IEEE Transactions on, vol.: 37 Issue: 1 Part: Jan. 1, 1999, pp.: 287–296.*

"Snowfall and rainfall forecasting from weather radar images with artificial neural networks", Ochiai, K.; Suzuki, H.; Shinozawa, K.; Fujii, M.; Sonehara, N., Neural Networks, 1995. Proceedings., IEEE International Conference on, vol.: 2, 1995, pp.*

"A clutter removal strategy for weather radars, based on neural network approaches and using polarisation diversity as feature space", da Silveria, R.B.; Holt, A.R., Radar 97 (Conf. Publ. No. 449), 1997, pp. 356–360, 1999.*

* cited by examiner

*Primary Examiner*—John B. Sotomayor
(74) *Attorney, Agent, or Firm*—Duft, Graziano & Forest, P.C.

(57) ABSTRACT

The computation system of the present invention comprises an improved method of moment estimation for devices which measure spectra as a function of range or time. The preferred embodiment of this system is illustrated as part of an automated meteorological monitoring system for the accurate real time detection of meteorological phenomena, such as winds, wind shear and turbulence. This automated meteorological monitoring system uses a standard weather radar transmitter to scan a predetermined volume of space with a stream of radar pulses to determine the characteristics of meteorological phenomena that are extant in the predetermined volume. The computation system of the present invention utilizes novel signal processing algorithms in the improved method of moment estimation to excise the valid data from the returns echoes, which are corrupted by the presence of contaminating signals. Separating the valid data from the noise in this manner improves the responsiveness and accuracy of the system in which this method is implemented.

14 Claims, 16 Drawing Sheets

METHOD OF MOMENT ESTIMATION AND FEATURE EXTRACTION FOR DEVICES WHICH MEASURE SPECTRA AS A FUNCTION OF RANGE OR TIME

FIELD OF THE INVENTION

This invention relates to Doppler measurement devices which are able to compute Doppler spectra as a function of range or time and, in particular, to a computation system which comprises an improved method of moment estimation, as applied to an automated meteorological monitoring system as the preferred embodiment of the invention, for the accurate real time detection of meteorological phenomena, such as winds, wind shear and turbulence.

PROBLEM

It is a problem in the field of spectra signal processing to extract valid data from the received signals. The signals can be radar, optical, infrared, tomography sonar in nature and the field of use can be meteorological monitoring, medical imaging, satellite imaging, automated mining, for example. The valid data represents a particular "signature" which must be identified and measured. The spectra received from the sensor(s) is corrupted by noise and the signature contained in the spectra is difficult to extract with present signal processing techniques.

It is particularly a problem in the field of automated meteorological monitoring systems to obtain timely, accurate and rapid estimates of meteorological phenomena that are extant in the region of space covered by the meteorological monitoring system. These monitoring systems typically use Doppler radar signals to ascertain the presence and locus of winds, wind shear and turbulence. To obtain timely, accurate and rapid estimates of these meteorological phenomena, the monitoring system must maximize the accuracy of the Doppler moments as well as the update rate and accuracy of the wind estimates. Existing automated meteorological monitoring systems are sometimes unable to achieve the desired results due to their inability to attain the accuracy required for these parameters.

Radar systems perform two primary functions: surveillance and tracking, and two secondary functions: target recognition and target measurement. For example, weather radar systems W as shown in FIG. 2 are of the surveillance type and function to search a volume of space V to detect the presence and identify the locus of meteorological events M which can effect local activities, such as the flight operations at an airport. Modem weather radar systems W are pulsed Doppler radar systems that transmit a stream of fixed duration pulses P of radio frequency energy at repeated intervals, termed the pulse repetition period (PRP). The transmitted pulses P are reflected by a plurality of scatterers in the pulse volume M and the received return echo signals RE are processed to extract Doppler information.

Weather surveillance radars W continually scan a volume of space V. The antenna beamwidth, antenna scan rate and pulse repetition frequency of the radar transmitter determine the number of pulses transmitted per unit of time and hence the number of return echo signals received by the radar W. A typical weather surveillance radar W transmits a plurality of pulses during the time it takes the antenna beam to sweep across a target (meteorological event) M. The radar energy reflected from the target M is returned to the directional radar antenna A and forwarded to the radar receiver R. The radar receiver R processes the returned echoes RE to minimize the noise contained in this signal. The signal contains a number of noise components including, but not limited to, clutter from reflections from obstacles, topographical features in the vicinity of the radar transmitter, as well as temporal and spatial variability of the winds and precipitation, low signal-to-noise ratios, velocity folding, Radio Frequency Interference (RFI), aircraft and other point targets (e.g., birds). The radar receiver signal processor must differentiate the returned echoes RE from the noise signals contained in the received signal to accurately determine the presence, locus motion and nature of targets M that are detected in the radar antenna beam pattern.

In order to fully exploit the utility of Doppler wind measurement devices in the real time detection of meteorological phenomena, such as winds, wind shear and turbulence, it is important that the data from these Doppler wind measurement devices be quality controlled. These Doppler wind measurement devices include lidars, sodars, weather radars and clear air wind profilers. Wind profilers, for example, are able to generate Doppler moments (and hence wind and turbulence estimates) from clear-air atmospheric returns by employing a transmitter pulse generation system with a very high pulse repetition frequency (PRF) and long dwell times. In this manner, a very large number of data samples are processed per unit volume of space to increase the signal-to-noise ratio (SNR) of the return echoes. The generally weak, clear-air atmospheric signal can thus be distinguished from the ambient noise level created by the radar hardware and various environmental sources external to the radar system.

In operation, a wind profiler averages a number of data samples which comprise time domain return-power values from a given radar beam direction, then a Feast Fourier Transform (FFT) is applied to produce a single, unaveraged spectra. This step typically uses a time series of data samples collected over a half-second interval. This process for producing a single, unaveraged spectra is repeated a number of times (on the order of 60) to create a series of unaveraged spectra. The wind profiler system then subsequently averages these individual, unaveraged spectra to produce an averaged spectra The first three moments of the averaged spectra are the basic measurement data that is obtained from the wind profiler. The zero-th moment of the averaged spectra gives the total signal power and, when combined with the noise level, gives the signal-to-noise ratio (SNR) for the measurement. The first moment of the averaged spectra is the radial velocity for the given transmitted radar beam in the corresponding antenna pointing direction and, when combined with the determined radial velocities from the transmitted radar beam in other antenna pointing directions, allows for the estimation of the wind vector. The second moment of the averaged spectra provides information on the spread of radial wind velocities within the radar pulse volume and can be used to estimate wind turbulence intensities. The individual wind estimates described above are further processed via a consensus algorithm to generate a quality-controlled wind estimate. In this step, the individual wind estimates (for each altitude) collected over a predetermined time interval are examined to ascertain whether there is a "cluster" of values that all lie within a prescribed wind velocity range of each other. If such a consensus exists, the average of these values is defined as the consensus wind estimate. Otherwise, no wind estimate is reported for that altitude, for the given time interval.

Presently, wind profilers produce the consensus wind value for each altitude and this consensus value can be considered an average value, with outliner removal. A variety of contamination sources often preclude the existing consensus algorithm from producing accurate wind data. This deficiency stems from a number of sources, including: stationary and moving ground clutter, temporal and spatial variability of the winds and precipitation, low signal-to-noise ratio, Radio Frequency Interference (RFI), velocity folding, aircraft and other point targets located in the field of view of the antenna beam pattern. A number of previous attempts at solving some of these problems have been made with only limited success.

Quality control algorithms presently in use in wind profilers deal with removing contamination at the consensus wind level and hence require data gathered over an extended period of time to produce valid results. These techniques are adequate for use in human interpretation of large scale meteorological features, but are inadequate for use in automated meteorological monitoring systems to obtain timely, accurate and rapid estimates of winds, wind shear and turbulence. There are additional algorithms for use with wind profiler data which are suitable for quality control at the wind estimation level. These techniques produce more accurate hourly wind data, but are inadequate for use in automated meteorological monitoring systems to obtain timely, accurate and rapid estimates of winds, wind shear and turbulence.

SOLUTION

The above described problems have been solved and a technical advance achieved in the field of spectra signal processing by the computation system comprising an improved method of moment estimation for devices which measure spectra as a function of range or time. The preferred embodiment of this system is illustrated as part of an automated meteorological monitoring system for the accurate real lime detection of meteorological phenomena, such as winds, wind shear and turbulence. This automated meteorological monitoring system uses a standard weather radar transmitter to scan a predetermined volume of space with a stream of radar pulses to determine the characteristics of meteorological phenomena that are extant in the predetermined volume. The computation system of the present invention utilizes novel signal processing algorithms in the improved method of moment estimation to exercise the valid data from the return echoes, which are corrupted by the presence of contaminating signals. Separating the valid data from the noise in this manner improves the responsiveness and accuracy of the system in which this method is implemented.

The computation system, comprising an improved method of moment estimation uses signal processing algorithms which are based upon a combination of mathematical analysis, fuzzy logic techniques and image processing methods. This improved method of moment estimation is applicable to a wide range of spectra-based systems, such as Doppler-based measurement systems. The underlying Doppler measurement system monitors a predetermined volume of space and produces a Doppler spectra for each range gate along a given pointing direction. At each range, the Doppler spectra can be considered a two-dimensional curve $g(x)$, where x is the Doppler velocity and $g(x)$ is the signal power at that Doppler velocity as illustrated in FIG. 20. The collection of all of the two-dimensional Doppler spectra as a function of range can be thought of as describing a three-dimensional surface $g(x,y)$, where $g(x,y)$ is the signal power at Doppler velocity x and range y, as illustrated as a contour plot FIG. 21. Since the coordinate axes do not have the same units, an a priori coordinate scaling is defined by:

$$\alpha \Delta v = \Delta x, \quad \beta \Delta R = \Delta y \tag{1}$$

where $\alpha$ and $\beta$ are the scale factors for Doppler velocity v and range R, respectively. Furthermore, the signal power $g(x,y)$ may also be scaled (e.g. linear or log) in order to accentuate certain characteristics of the signal. This can be quite useful when the signal has a large dynamic range.

The three-dimensional Doppler velocity-range coordinate space is then segmented into a plurality of subregions. The signal power data for each of these sub-regions are processed by the computation system to compute a plurality of mathematical quantities, such as gradient and curvature. These computed mathematical quantities are then synthesized via fuzzy logic techniques to generate a local, composite likelihood value, which indicates how similar the data in the given sub-region are to the properties of the desired signal. This process can also be applied in the opposite sense. That is, to identify sub-regions which correspond to known contamination characteristics. The computation system then uses global image processing methods on the computed composite likelihood values to extract the desired portion of the Doppler spectra, which is the atmospheric signal region in the meteorological monitoring system of the preferred embodiment of the invention. The Doppler moments are then calculated from the appropriately identified atmospheric signal region.

While these techniques used by the computation system are generic relative to all the above mentioned spectra based measurement devices, a specific application to Doppler wind profilers is described as the preferred embodiment of the invention.

DETAILED DESCRIPTION

Figure 2:
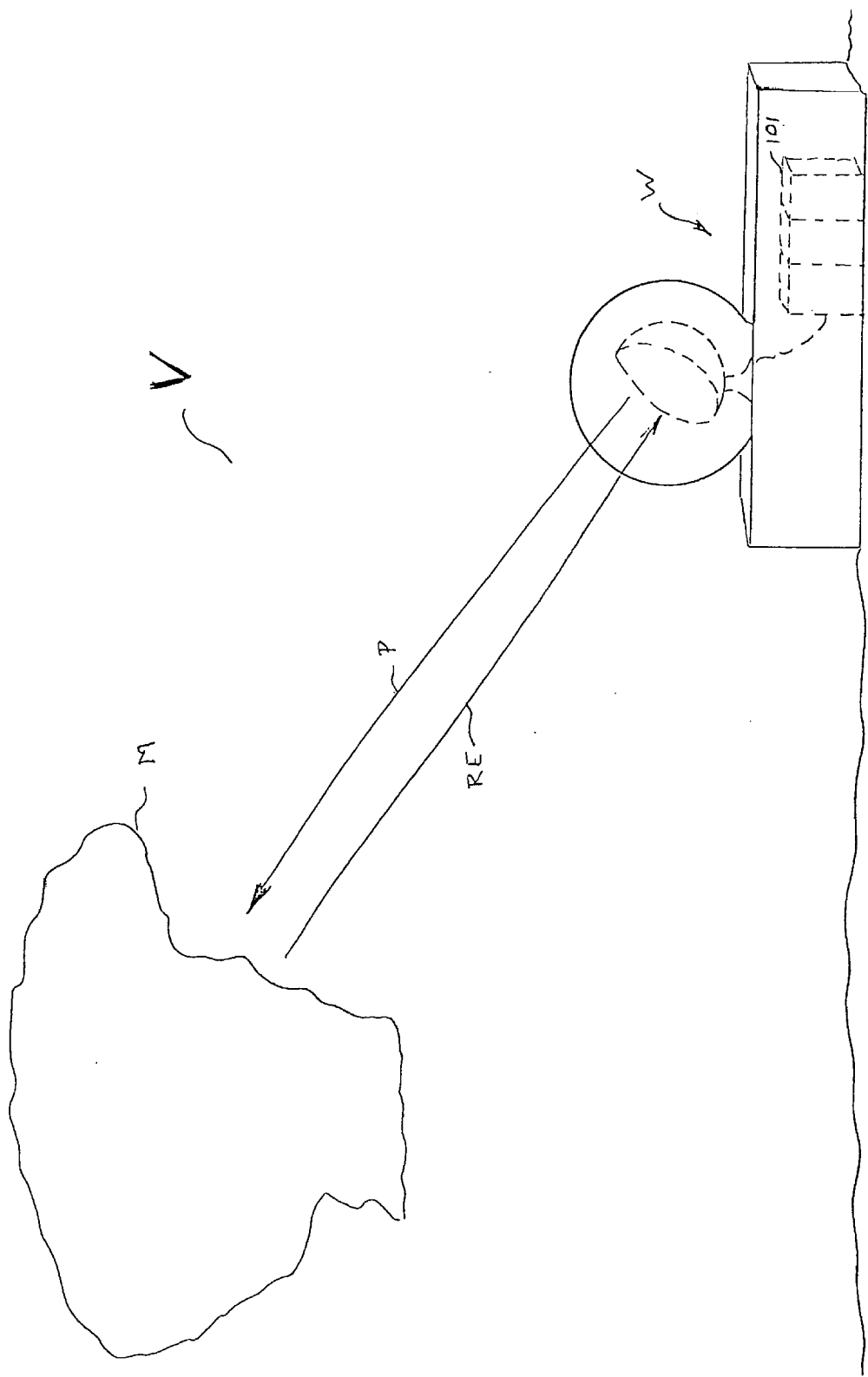
FIG. 2 illustrates in block diagram form the overall architecture of the automated meteorological monitoring system.

FIG. 2 illustrates in block diagram form the overall architecture of an automated meteorological monitoring system in which the computation system, which comprises an improved method of moment estimation of the present invention, is implemented. The preferred embodiment of the invention is an automated meteorological monitoring system which is also termed a weather radar system W which is used to detect a meteorological phenomena which is extant in the predetermined region of space scanned by the radar beam produced by this system. The meteorological automated monitoring system W processes the return echoes RE in the computation system C to thereby excise the desired data from the return echoes which are corrupted by the presence of contamination signals.

For the purpose of this description, a wind profiler system W is disclosed as an application of the computation system C. The improved method of moment estimation implemented by the computation system C is especially pertinent to a wind profiler system since the accuracy and responsiveness of a wind profiler system is a function of the accuracy of the Doppler moments. There are numerous other Doppler-baised systems which can benefit from the use of the computation system C and the description of a wind profiler application is simply for the purpose of illustration and is not intended to limit the scope of the computation system C.

Moment Calculation

Figure 3:
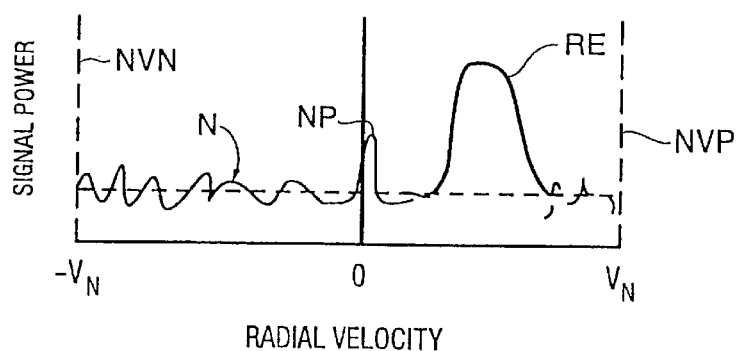
FIG. 3 illustrates an averaged Doppler spectra with a clearly discernible desired signal.

The inadequacies of existing wind profiler systems in locating the atmospheric signal region in the averaged Doppler spectra is the problem solved by the computation system C used in the automated meteorological monitoring system of the preferred embodiment of the invention. The preferred embodiment of the invention comprises a wind profiler weather radar system W which processes the return echoes produced by meteorological phenomena M in a unique manner via the computation system C of the present invention to more accurately and quickly determine the characteristics of the meteorological phenomena M extant in the predetermined region of space V which is scanned by the radar beam of the weather radar system W. In the preferred embodiment of the invention, the wind features of the meteorological phenomena M are measured by wind profiler weather radar system W. In this instance, the Doppler spectra which result from the return echoes RE generally contain a clear-air wind return echo signal combined with various clutter signals, which signals are all superimposed on a background noise signal. If the clutter and noise signals are small relative to the atmospheric return echo signal, the identification of the atmospheric return echo signal location is straightforward and the resulting moments are accurate. However, when the atmospheric return echo signal is obscured or dominated by clutter and/or noise, the existing wind profiler moment-finding algorithms produce spurious results. The moment-finding technique of existing wind profiler moment-finding algorithms utilizes the peak of the Doppler spectra as the starting point for finding the atmospheric return echo signal region. Therefore, if the peak of the Doppler spectra is associated with noise or clutter and it is separated from the atmospheric return echo signal, the resulting moments computed by the wind profiler system W are erroneous. As an illustration, FIG. 3 provides a diagram of a typical uncontaminated averaged Doppler spectra, plotted as signal power as a function of radial velocity. In this figure, the atmospheric return echo signal (RE) is clearly distinguished from the noise N (dashed horizontal line indicates the noise floor) and a weak clutter signal comprising the noticeable peak NP present near the zero radial velocity point on the horizontal axis. The dashed vertical lines NVP, NVN indicate the Nyquist velocity range. The assumed atmospheric return echo signal region RE is found by going from the peak of the largest signal (RE) down to the noise level N on both sides of this selected peak. It is clear that choosing the peak indicated by the region RE of FIG. 3 in this example produces the desired result.

Figure 4:
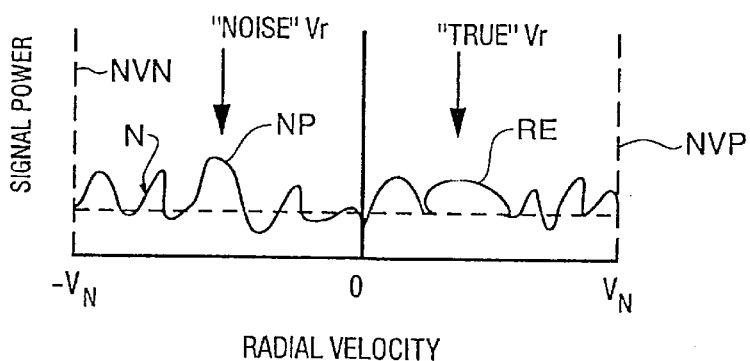
FIG. 4 illustrates an averaged Doppler spectra with low signal-to-noise ratio.

Next, consider a case wherein the signal-to-noise ratio is low in that the atmospheric return echo signal RE is buried in the noise N. FIG. 4 illustrates a typical example of this situation where a noise contaminated averaged Doppler spectra is plotted as signal power as a function of radial velocity. In this case, utilizing the peak value to determine the location of the atmospheric return echo signal RE give an erroneous moment calculation. That is, the peak of greatest amplitude is NP in FIG. 4, assigned at the location of the arrow designated "noise Vr" in FIG. 4 which is associated with the noise NP not the atmospheric return echo signal RE, which has a slightly lesser amplitude than the noise peak NP.

Figure 5:
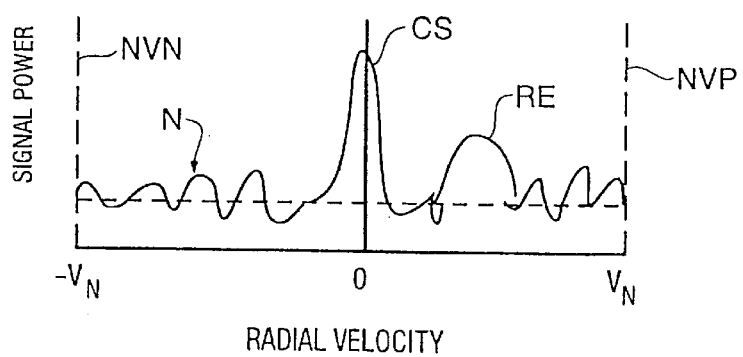
FIG. 5 illustrates an averaged Doppler spectra with strong clutter signal.

Finally, consider a situation with large amplitude clutter signal, which dominates the atmospheric return echo signal. FIG. 5 illustrates a typical example of this situation where a large amplitude clutter signal contaminated averaged Doppler spectra is plotted as signal power as a function of radial velocity. As in the previous case, the atmospheric return echo signal RE is missed by using the peak-search method since the large amplitude clutter signal CS is of greater magnitude than the atmospheric return echo signal RE. From these examples, it is clear that another method for discerning the atmospheric return echo signal in the presence of contamination is required to ensure that the proper signal is processed to determine the wind profile.

Contamination Sources

It is useful to categorize the contamination sources into continuous and intermittent sources. Furthermore, these criteria (continuous vs. intermittent) should be relative to a specific processing task. For example, a drifting rain shower may be varying on spatial and/or temporal scales that do not affect the radial velocity estimate from one individual beam of radar pulses, since the rain is constant in that radar beam over the time it takes to produce an average spectra. However, the rain may not be seen in the other radar beams and when a wind estimate is made using the radial velocities from all of the radar beams (from different times and pointing directions), the rain-induced variation may produce highly spurious estimates. Hence rain showers can be alternately viewed as continuous at the average spectra (radial velocity) level and intermittent at the wind-estimate level.

The utility of this categorization scheme is that it can help to prescribe where in the processing stream the various contamination sources should be mitigated, such as at the unaveraged spectra, averaged spectra, or wind estimation level. The following numbered items discuss this issue in more detail.

Figure 6:
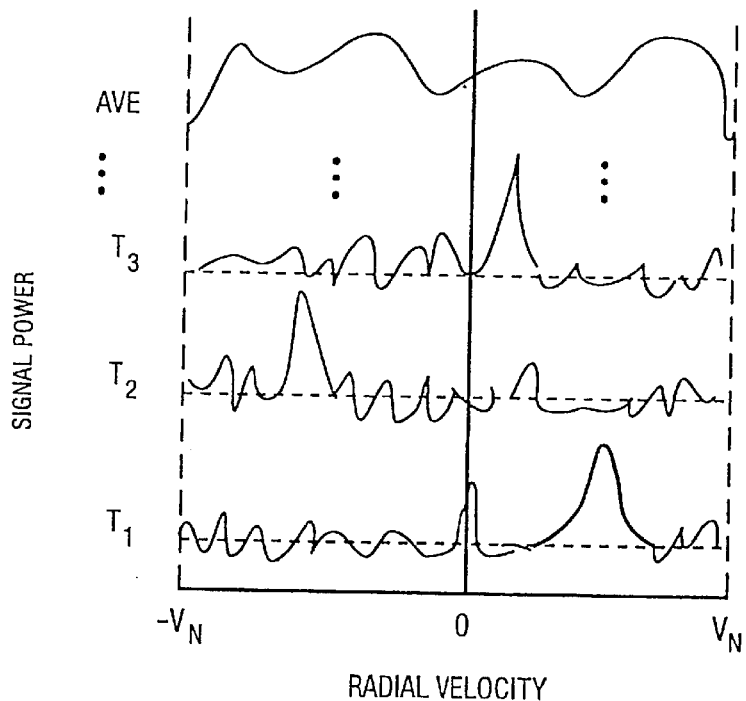
FIG. 6 illustrates the aircraft problem with time sequence of unaveraged spectra, and the subsequent averaged spectra for a given height.

(1) Aircraft.—Due to their large radar cross-section and rapid motion, aircraft flying through the radar beam pattern can be a significant contamination problem. Aircraft can be considered the prototypical intermittent clutter source and affects the radar return echo signal processing at the moment level. FIG. 6 illustrates the aircraft problem with a time sequence of unaveraged spectra, and the subsequent averaged spectra for a given altitude at which the aircraft is present. FIG. 6 is a plot of signal power as a function of radial velocity, with the sequence of curves plotted thereon representing the averaged spectral level (AVE) and a time ordered succession of unaveraged spectral levels, with three of the unaveraged curves, T3, T2, T1 being shown in FIG. 6. For each of the unaveraged spectra T3–T1, the aircraft appears as a localized, large-amplitude return echo signal randomly placed along the radial velocity axis. The random placing of the aircraft return echo signal is thought to come from multiple foldings combined with the different line-of-sight velocities as the aircraft rapidly flies through the radar beam pattern. If the aircraft is seen in a significant number of these raw spectra, the resultant averaged signal can be "smeared" across the whole velocity axis. Due to the aircraft's very large returned echo signal strength, the generally much weaker atmospheric return echo signal is totally obscured.

(2) Rain showers.—This category can exhibit both intermittent and continuous contamination, affecting both the moment and wind estimate portions of the wind profile processing.

(3) Quasi-Stationary Ground Clutter.—This continuous contamination source arises from swaying bushes, trees, power lines, etc. The level of contamination produced by quasi-stationary ground clutter is usually correlated to the ambient wind speed and affects the moment portion of the wind profile processing.

(4) Moving Point Targets.—Moving ground traffic poses a similar, though less severe problem as with aircraft. Migrating birds can also create severe problems with moment estimation. As an intermittent clutter source, moving point targets affect wind profile processing at the moment level.

(5) Velocity Folding.—Velocity folding can occur under conditions of very strong winds, heavy rain, and a combination of the two when these conditions produce radial velocities which exceed the wind profiler system's pre-set Nyquist velocity. This contamination source can be intermittent or continuous, thereby affecting both the moment and wind estimate portions of the wind profile processing, respectively.

(6) Low Signal-to-Noise Ratio.—Low Signal-to-noise ratio data tends to be, a function of the ambient atmosphere: low humidity or very light winds (no turbulence-induced changes in the refractive index). This is in general a continuous contamination source.

Figure 7:
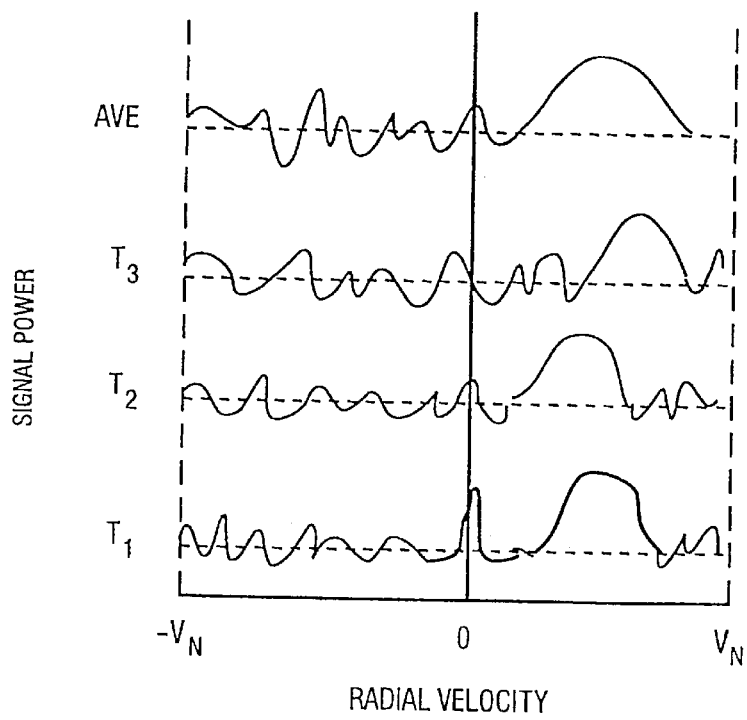
FIG. 7 illustrates the effect of non-stationary wind fields (large scale turbulence) on spectral averaging.

(7) Non-Stationary Wind Field.—Large wavelength traveling waves or a frontal passage is a contamination source of a continuous nature, affecting the wind estimate portion of the wind profile processing. If the non-stationarity is due to turbulence, this is generally an intermittent contamination source. This is a subtle condition, affecting the moment calculation resulting in an overestimation of the second moment. To see this, consider three unaveraged spectra used to compute an averaged spectra. FIG. 7 is a plot of signal power as a function of radial velocity, with the sequence of curves plotted thereon representing the averaged spectral level (AVE) and a time ordered succession of unaveraged spectral levels, with three of the unaveraged curves, T3, T2, T1 being shown in FIG. 7. If the larger scale turbulent eddies are perturbing the velocity field, the unaveraged spectra may appear as in the bottom three spectra T3–T1 in FIG. 7. The location of the radial velocity is varying, yet the width of the spectra (related to the statistically stationary, smaller scale turbulent eddies) is not. When the average of these three spectra is taken, as seen in the top spectra (AVE) in the figure, the combination of the individual spectra causes an excess broadening of the averaged spectra. An erroneous conclusion from this broadened averaged spectra might be that the strength of the small scale turbulence is very large, where in fact it is caused by a temporal variation of the larger scale flow.

(8) Inhomogeneous Wind Field.—This contamination source is usually due to shear in the horizontal wind field and affects the wind estimation process if the standard uniform wind assumption is invoked.

(9) Radio Frequency Interference (RFI).—This source of contamination comes from various broadcast radio sources (cell phones, ham radios) which are at frequencies close to the profiler's transmission frequency. RFI contamination appears as a fairly large amplitude signal, at a narrow band of Doppler velocities, and over many heights. This type of contamination is similar to ground clutter in that as long as it is well-separated from the atmospheric signal, it is easy to identify and remove.

It is important to note that any algorithm for computing rapid update wind estimates is more sensitive to intermittent data quality problems. That is, any item from the above list that is indicated as a "moment-level" problem also contaminates the subsequent wind estimation processing. This arises from the inability to fully utilize techniques such as the consensus algorithm to perform long-time averages and mitigate outlier contamination.

Mitigation Algorithms

Figure 1:
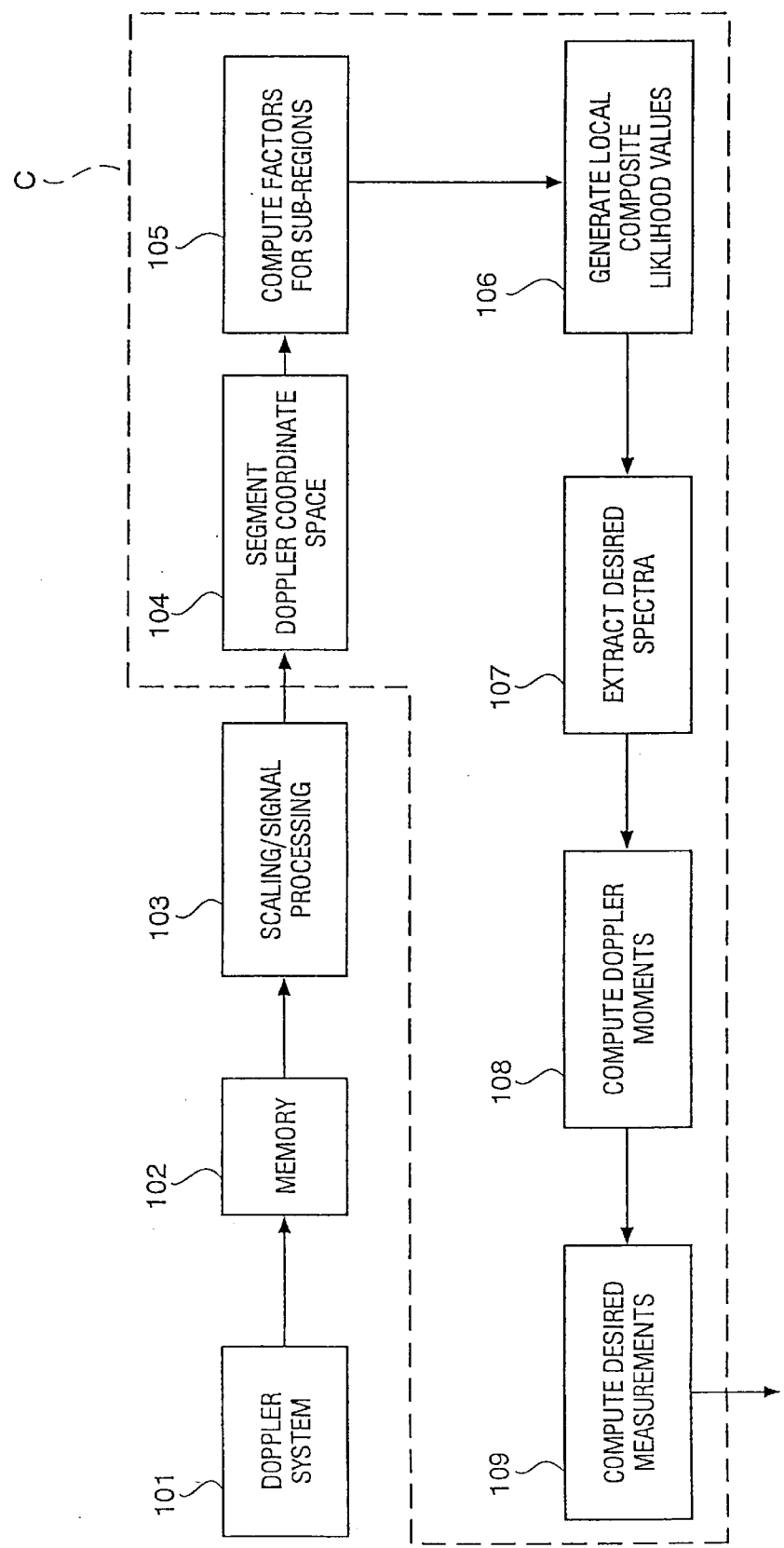
FIG. 1 illustrates the basic architecture of the meteorological monitoring system of the preferred embodiment of the present invention.

In order to excerpt valid and useful data from the return echo signals, the computation system C uses the architecture illustrated in FIG. 1. A suite of advanced signal processing algorithms are utilized in the computation system C of the present invention to produce accurate Doppler moments which are needed in order to generate rapid-update wind, wind shear and turbulence estimates. In order to obtain the desired responsiveness and accuracy, it is clear that removing the above-mentioned contamination sources is imperative. Furthermore, the only way to accomplish this is, depending on the specific contamination source, to process the data at at least one and preferably a plurality of the following levels: the unaveraged spectra and averaged spectra levels.

Mathematical-Fuzzy Logic Feature Extraction

Human experts, examining averaged spectral data, can usually identify the region of the atmospheric return echo signal even when the spectra are contaminated by noise and clutter. Unfortunately, automated algorithms that have been developed in the past to identify the atmospheric return echo signal are significantly less skillful than human experts. Furthermore, existing automated techniques have generally been used in postprocessing or analysis over a long time interval and do not operate effectively over a shorter time interval. The fully automated techniques described herein are capable of approaching the skill level of the human expert and are thus suitable for real-time applications in meteorological monitoring systems. The approach disclosed herein as the preferred embodiment of the invention relies on mathematical analysis combined with fuzzy logic and image processing techniques to simulate the methodology of the experts.

Two quite different applications of this methodology are utilized in processing the Doppler spectra: (1) removing the contamination from intermittent point targets at the unaveraged spectral level, and (2) extracting the atmospheric return echo signal from the averaged spectra. These two problems are almost exact opposites. In the former case, the data contaminant is the desired feature that is to be isolated and removed, whereas in the latter situation the atmospheric return echo signal is to be extracted from the data contaminants. Nevertheless, the basic processing algorithm; for these disparate applications are the same, the differences residing in implementation specifics.

Building a Fuzzy Logic Algorithm

In the last few years, fuzzy logic algorithms have evolved into a very useful tool for solving complex, real-world problems. Fuzzy logic is well suited to applications in linear and nonlinear control systems, signal and image processing, and data analysis. The strength of fuzzy logic algorithms lies in their ability to systematically address classification, pattern recognition, and the natural ambiguities in measurement data. Typical non-fuzzy applications require a rigid bifurcation into "true" or "false" and nothing can lie in-between. Standard probability theory merely quantifies the likelihood that the outcome of a given process or experiment is true or false. Fuzzy logic allows for a more direct, intuitive, and flexible methodology to deal with the vagaries of the real world. While fuzzy logic algorithms have been widely and successfully applied in the engineering sciences, the use of these techniques in the atmospheric sciences has been extremely limited. Due to the inherent ambiguity in many aspects of atmospheric data measurement, analysis and numerical modeling, fuzzy logic is a very useful tool in this field.

Figure 8:
FIG. 8 illustrates an interest map for "white-ness"

In general, there are four main steps in the construction of such fuzzy logic algorithms: fuzzification, inference, composition and defuzzification. The first step performs the conversion of measurement data into scaled, unitless numbers which indicate the correspondence or "interest level" of the data to the desired result. This correspondence is quantified by the application of a prescribed functional relation, or "interest map" between the data and the interest level. As an example, consider a number of balls which have been painted various shades of grey, where "white" and "black" are the two extremes. In Boolean logic, the question: "is this ball white?" can only have one of two answers, "yes" or "no." Hence, the answer to this question for a white or a black ball is simple. However, for a grey ball which is "mostly white," Boolean logic forces a "rounding-off," the mostly-white ball is categorized as "white." In fuzzy logic, an interest map which takes into account the shades of grey is constructed, as illustrated in FIG. 8 where a curve of interest as a function of whiteness is plotted.

The second step, inference, allows for the construction of logical rule expressions. In Boolean logic, such a rule might take the following form:

$$\text{if (A=TRUE AND B=TRUE) THEN(C=TRUE)} \qquad (2)$$

whereas in fuzzy logic such a rule might appear as:

$$\text{if (A=0.7 TRUE AND B is 0.3 TRUE) THEN(C is 0.4 TRUE)tm} \qquad (3)$$

where a value of 0.7 TRUE would be the resultant interest value after applying; an interest map to the data A. For the "white-ness" example above, a ball that is light-grey may have an interest value of 0.7. It is important to note that in this example a maximum truth value of 1.0 was assumed. While this is enforced in Boolean logic, it is not necessary in fuzzy logic. That is, if it is appropriate for the given problem a maximum truth value of 2.8 could be used, so that 0.7 true would result in an interest value of 0.7×2.8=1.96. The use of inference rules is not incorporated in the present application, and the synthesis of different data types is handled through the next step, composition.

The third step in building fuzzy logic algorithms is composition, wherein the interest values from a number of different data types are combined in a systematic fashion This process can result in a new, higher-level fuzzy rule or in a precise value. For the present application, the interest values at a given (radial velocity-range) point are combined into a "total" interest value ($I_T$), a precise, unique number for that point by using a weighted linear combination. The linear combination of the individual interest values is computed with coefficients ($\alpha_i$) chosen to maximize a given performance measure such as a statistical skill level. This can be done once and for all by various optimization routines or from empirical analysis. Mathematically, the total interest field at the radial velocity-range coordinate location ($\underline{x}$) is given by the simple formula:

$$I_T(\underline{x}) = \frac{\sum_i \alpha_i \cdot I_i(\underline{x})}{\sum_i \alpha_i} \qquad (4)$$

where the sum is taken over all interest fields. It is important to note that all of the individual interest maps must have the same range, all 0 to 1 or all −1 to 1, etc. The normalization factor in Equation (4), ensures that the range of values for the total interest is in the same range as the interest maps. Another, more general application of Equation (4) employs adaptive weighting:

$$I_T(\underline{x}, t) = \frac{\sum_i \beta_i(\underline{x}, t) \cdot \alpha_i \cdot I_i(\underline{x})}{\sum_i \beta_i(\underline{x}, t) \cdot \alpha_i} \qquad (5)$$

where $0 \leq \beta_i(\underline{x}, t) \leq 1$ can be considered as "confidence" values computed for each space-time point. For example, using the signal-to-noise ratio to modulate the weights low signal-to-noise ratio leading to lower values of $\beta$, and increasing the $\beta$ values with higher signal-to-noise ratio values.

The final (optional) step, defuzzification, takes the result of the composition step, if it had generated a composite fuzz rule, and produces a precise number. In the present application, this step is mainly performed via the composition process described above. However, as input into the image processing portions of the algorithm, the total interest values are thresholded. So that in a sense, each radial velocity-range point is assigned a precise number: one or zero, depending on whether the point is, or is not, associated with a given feature. In this context "feature" can refer to any of the following: atmospheric signal, rain, birds, aircraft, RPI, etc.

Example Problem

The algorithm concepts introduced above can be more easily understood via the following simplified example. Ground clutter can be a serious source of data contamination, appearing as a large-amplitude signal centered at zero velocity and extending for a number of altitudes above the ground. The human expert has no problem recognizing this type of feature, however it is a non-trivial matter to have a computer do the same task in an automated and skillful manner.

It should be noted that the techniques described in the following simplified example are merely a good intuitive way to understand the use of the fuzzy logic methodology. As with all of the algorithm elements described below, it is usually best to break a complicated problem down into very specific and focused sub-algorithms. A single technique that would simultaneously remove the ground clutter signal while retaining the atmospheric return echo signal is problematic since the ground clutter is often removed at the expense of the desired atmospheric return echo signal. Hence, a more sophisticated method includes the implementation of a sub-algorithm specifically designed to identify clutter and then generate a clutter feature which is subsequently employed in the moment finding sub-algorithm, described below. Nevertheless, the following simplified example illustrates the salient points in the fuzzy logic methodology.

Figure 9:
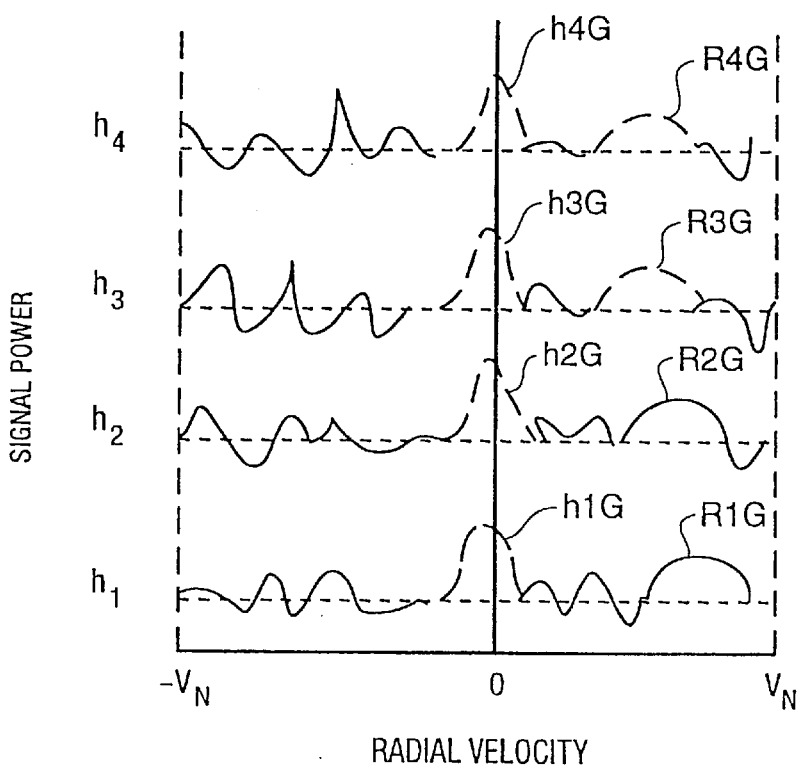
FIG. 9 illustrates an example of a ground clutter signal and atmospheric return as a function of velocity and height.

Mathematically, this clutter signal can be defined as a set of points which are: (1) close to symmetric around zero radial velocity; (2) have large slopes along the radial velocity axis (positive on one side of zero and negative on the other); (3) have small slopes along the range axis; (4) have large negative curvature along the radial velocity axis (around zero radial velocity); and (5) have small curvatures along the range axis. These characteristics can be visualized as a ridge-line running along the range axis. FIG. 9 illustrates this type of feature along with an atmospheric return. The graph of FIG. 9 illustrates a plot of signal power as a function of radial velocity for a plurality of ranges, four of which h1–h4 are shown. Each of the curves plotted in FIG. 9 include a ground clutter signal component h1G–h4G as well as and atmospheric return echo signal component RE1–RE4.

Unfortunately, all of the above-mentioned characteristics of the ground clutter signal are quite similar to the characteristics of the actual atmospheric return echo signal. These signals tend to differ only in signal magnitude. Therefore, clutter signals may have "large" slopes, whereas the atmospheric return echo signal may have "not-too-large" slopes. Furthermore, on the edges of the clutter signal the slopes may also be "not-too-large". The problem of distinguishing among signals of this type is very amenable to fuzzy logic techniques. This is due to the incorporation of all available information in a systematic way before making a determination of whether to keep data or throw it out. That is, strict thresholding of individual data types is avoided, so that the detection of a feature from multiple indicators is possible. Furthermore, the use of confirming information from disparate quantities, such as slopes and curvatures, reduces the likelihood of generating false feature detections.

Interest Maps

Figure 10:
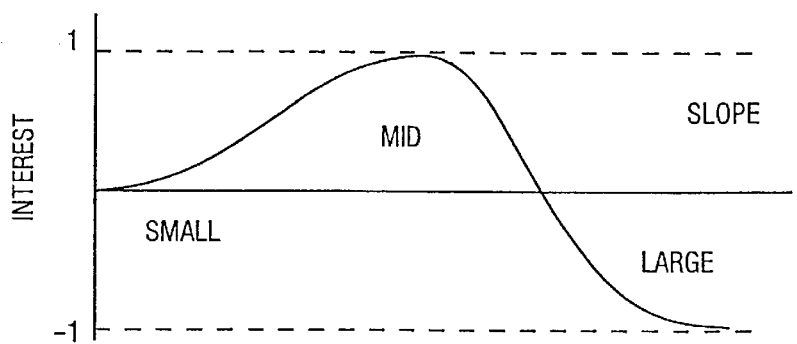
FIG. 10 illustrates an example of an interest map for the absolute value for t he slope of the spectral signal.

Continuing the ground clutter example, a large positive or negative slope of the data values in the along-radial-velocity-axis direction is considered a strong indicator of clutter. Since the intention is to remove this contamination, it is given a negative interest value. Moderate slopes of the plotted data values may be associated with the atmospheric return echo signal so that they are given a positive interest value. Slopes of the data values that are close to zero can be located near the peak of clutter or atmospheric return echo signals, or even in regions dominated by noise. As described in detail below, these slope calculations are from a local least squares or wavelet analysis, so that noise regions can have small slopes when smoothed via the least squares fit or filtered out with the wavelets. These points might be thought of as "neutral" indicators of clutter and hence are given interest values close to zero. Thus an interest map for the absolute value of the slope of the data values might look like the curve illustrated in FIG. 10.

It is convenient to think of the interest values as describing how well the given data value corresponds to a desired property. For this application, the interest maps have been designed to range between ±1. As mentioned above, however, the interest values are not constrained to have values between ±1, in fact they can take any arbitrary values as long as they are consistent for all the individual interest maps. The use of the "correspondence" model merely allows for the selection of the interest maps in an intuitive manner. This is a major distinction between fuzzy logic and probability theory: the interest maps can describe the situation in a probabilistic context (if a probability density function is known), with the values ranging between 0 and 1, however it is not necessary. This allows for more flexibility in implementing the technique and is also capable of incorporating the intuition and knowledge of the human expert. The interest maps are constructed from the experience of scientists and algorithm developers. If desired, they can also be determined by a variety, of quantitative techniques: via known probability density functions, optimization methods and/or neural networks. The performance of the algorithm is quite robust in the sense that the overall performance is relatively insensitive to small changes in the interest at maps. It seems that reasonable interest maps give very good performance since the stability comes from combining information from a variety of sources.

Interest Fields

Figure 11:
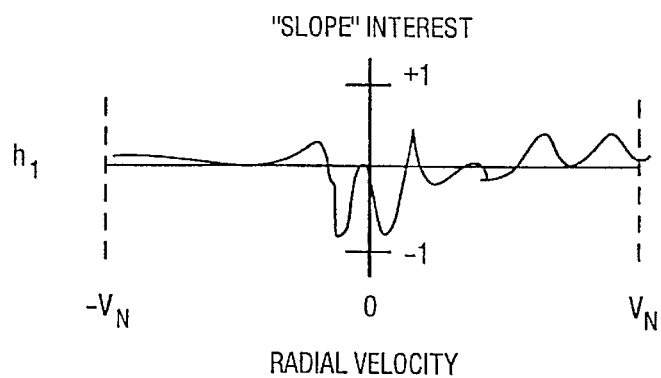
FIG. 11 illustrates an interest field after application of the "slope" interest map.

Via the interest map, each point in the radial velocity-altitude domain can be assigned an interest value based on the value of a data field, resulting in an interest field. Applying the slope interest map from FIG. 10 to the slopes of the plotted data values along the radial velocity axis to the data from the first altitude h1 in FIG. 9 might result in the "slope" interest field as seen in FIG. 11. This figure illustrates how the large slopes of the plotted data values associated with the clutter signal are given strong negative weights (two negative peaks surrounding zero radial velocity), whereas the moderate slopes of the atmospheric return echo signal are given positive weights (two small positive humps at the far right of the atmospheric return echo signal).

However, it is clear that this single procedure is not sufficient to unambiguously identify the atmospheric return echo signal from the clutter signal. That is, just as for the atmospheric return echo signal, the edges of the clutter signal also have regions with moderate slopes and have been given positive weightings. Furthermore, the central regions (area of small or zero slopes) for both of these signals have been given similar, neutral weightings. In order to further amplify the wanted atmospheric return echo signal while simultaneously de-emphasizing the unwanted noise and clutter, other characteristics of each of these signals are analyzed with interest fields.

Combining Interest Fields

In general there is more than one source of identifying characteristics, such as slope and curvature, along both the radial velocity and range axes, and the above process are repeated for the several quantities, generating a set of interest values for each analysis point. The individual interest values at a given point are combined via Equation (4) into a "total" interest value ($I_T$) for that point.

Figure 12:
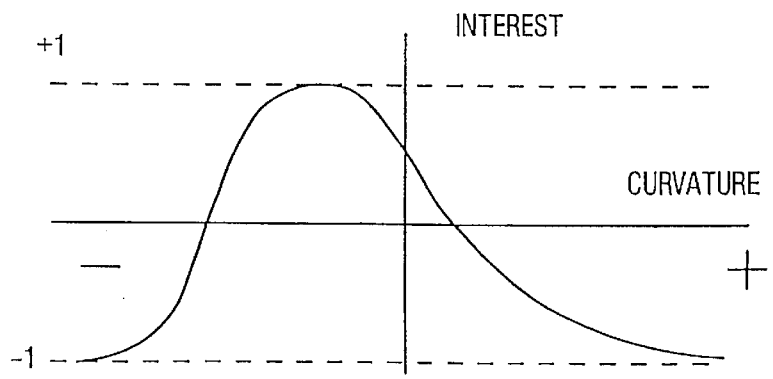
FIG. 12 illustrates an interest map for the curvature field.

For the ground clutter example, a second interest field is constructed from the curvature of the data values at each point. Large negative curvature tends to be associated with the center region of the ground clutter and moderate negative curvature with the center of the atmospheric signal. Furthermore, small positive curvature is associated with the edges of a feature, whereas large positive curvature is associated with noise or other data contaminants. An interest map for the curvature field may look like that shown in FIG. 12.

Figure 13:
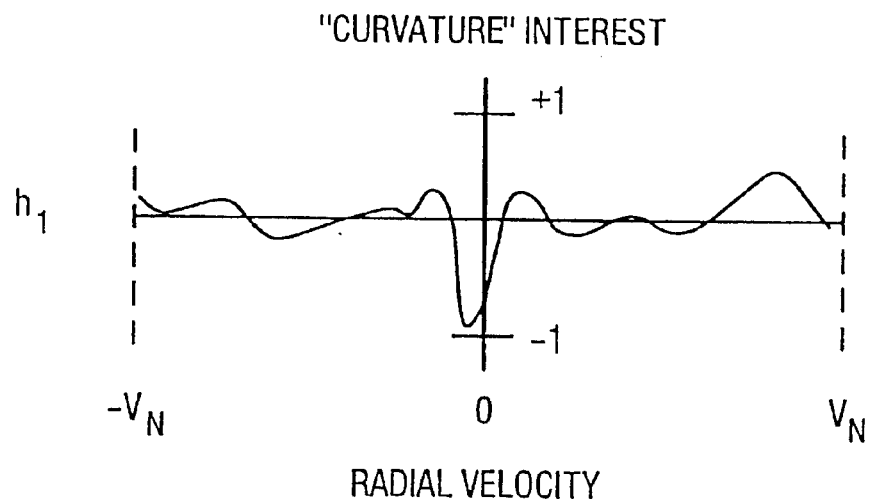
FIG. 13 illustrates a curvature interest field for the data example.

As above, this interest map is applied to curvature along the radial velocity axis for the first range h1 of the data from FIG. 9, resulting in the "curvature" interest field in FIG. 13. It can be seen that the slope and curvature interest fields are complimentary, the regions of large negative interest from the curvature field identify the central region of the clutter, whereas the area of large negative interest from the slope field identify the "sides" of the clutter signal.

Figure 14:
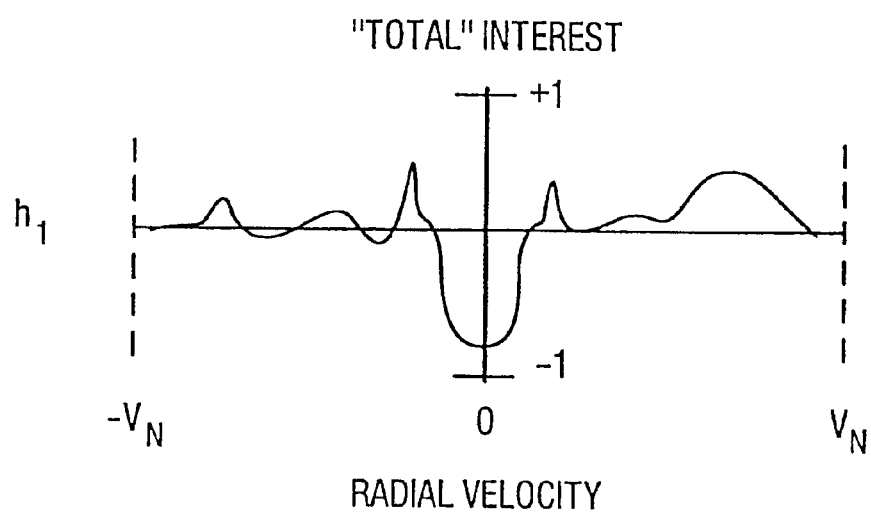
FIG. 14 illustrates a "Total" interest field, using along-velocity-axis slopes and curvatures.

In general, there would be a number of interest fields to combine, however in this simplified example, a total interest value $L_T(\underline{x})$ at a given point in the velocity-height coordinate system would be assigned by a linear combination of the two interest values:

$$I_T(\underline{x}) = [\alpha_S \cdot I_S(\underline{x}) = \alpha_C \cdot I_C(\underline{x})]/(\alpha_S + \alpha_C) \qquad (6)$$

where $\alpha_S$ and $\alpha_C$ are the constant weights. FIG. 14 illustrates what the total interest field looks like using equal coefficients for the two interest values.

Feature Extraction

In this hypothetical example, the correct location of the atmospheric return echo signal has become apparent as the broad, positive-interest hump RE on the right hand side of FIG. 14. In the application to real data, the results are not quite so distinct and further processing is required to fully extract the desired signal. The small spikes surrounding zero radial velocity in FIG. 14 illustrates this problem. Localized regions of "reasonable" amplitude interest values may come out of the above-mentioned processing steps. These features may be randomly located, as in noise-dominated signals, or they can be locally-coherent, as in the edges of a clutter signal illustrated in the above example. In order to address this problem, it is required to move from finescale analysis to a more global analysis.

Figure 15:
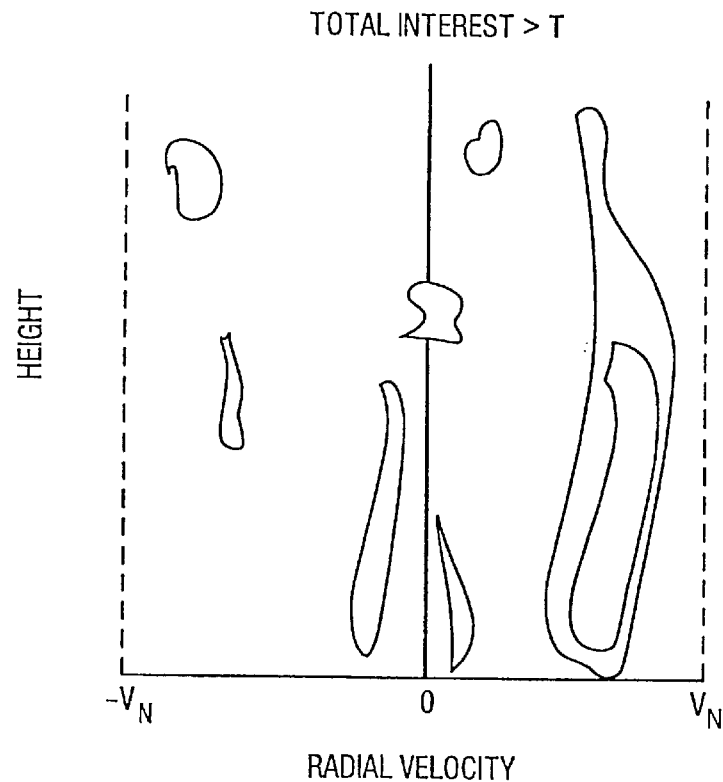
FIG. 15 illustrates a contour map of the total interest values above a threshold "T"

The next step of the computation process is to build up "candidate features" from the set of total-interest points that are above a given threshold. It is important to note that until this point, strict thresholding of the data has been avoided, thus minimizing the loss of information. FIG 15 illustrates what a contour map of the total interest values above a threshold "T" might look like for the present example. The plot of FIG. 15 represents a mapping of interest as a function of both range and radial velocity. As in FIG. 14 above, the atmospheric return echo signal on the right hand side of the figure stands out to the human eye, although smaller regions of above-threshold interest are visible. However, these contours are merely graphical constructs, the data is still individual points not distinct features. The human expert would visually process the local information into global features. Therefore, in this stage an attempt is made to replicate the human's ability to process the image and extract the desired signal from the contamination.

There are a number of image processing techniques applicable to this type of feature extraction and characterization. In the preferred embodiment of the invention, two methods that have previously been applied to weather radar images are utilized: a 2d clumping algorithmrnfor the unaveraged spectra and a "linear-chain" algorithm for the averaged spectral processing. In both methods, local data are thresholded, combined and then associated with distinct, spatially contiguous features. Various analytical or empirical rules can then be applied to these features to remove the "false" ones and retain the "true" ones. For example, a reasonable a priori assumption might be that an atmospheric feature extend for a substantial number of ranges. A subsequent rule could then relate to the number of ranges that a particular feature occupies. Assigning a "iscore" to each feature based on the sum of all the total interest values of its constituent points, might be another discrimination technique. These two simple rules are probably sufficient to identify the correct feature in FIG. 15.

Moment Calculations

For this averaged spectra example, once the correct feature has been identified, the moments are calculated in a similar fashion to the existing methods. There are certain details of this procedure related to the region over which the moments are computed, which are somewhat different than the standard method and deserve some discussion. The standard method determines the portion of the spectra over which the moments are computed by starting at the spectral peak and following the spectra down on both sides of the peak to the noise floor. Obviously, if the spectral peak is associated with a contamination source, this method can given erroneous moment values. The feature extraction techniques described above can distinguish between the desired atmospheric return echo signal and contamination, hence this knowledge can be applied to produce more accurate moments. It should be noted that for some wind profilers, a site adaptable parameter, (the altitude below which ground clutter is expected to be present), is currently used in an attempt to mitigate this problem. That is, below this a priori altitude value, a search for the spectral peak is made away from zero velocity. This method does often work, however it fails if the ground clutter contamination extends above this altitude, or if there is contamination from moving clutter sources.

For future reference, the computational method for generating the first three moments (signal power, radial velocity and variance of the spectrum, respectively) is described. First, the noise level (N) is computed and subtracted from each signal value (S (v) ), yielding the modified signal values, $\hat{S}(v) = S(v) - N$. Assuming the two "cut-off" radial velocities ($V_1$, $V_2$) are known, the moments ($M_0$ $M_1$, $M_2$ are then given by:

$$M_0 = \int_{V_1}^{V_2} \hat{S}(v) dv \qquad (7)$$

$$M_1 = \frac{1}{M_0} \int_{V_1}^{V_2} v \hat{S}(v) dv$$

$$M_2 = \frac{1}{M_0} \int_{V_1}^{V_2} (v - M_1)^2 \hat{S}(v) dv$$

Figure 16:
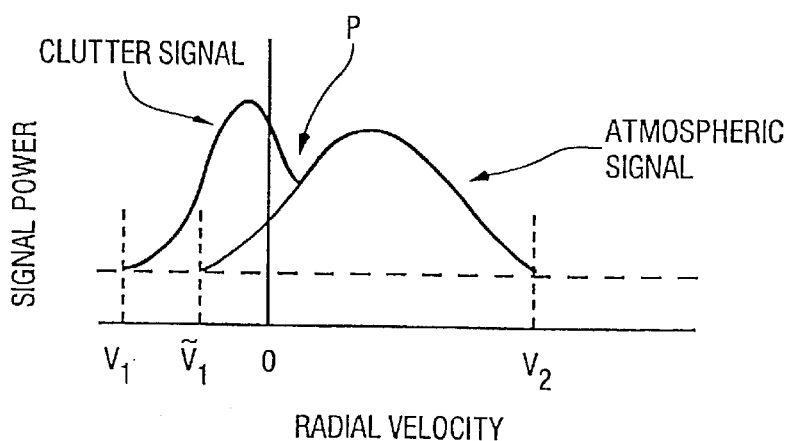
FIG. 16 illustrates an expanded region of overlapping clutter and atmospheric signal, including extrapolation of the atmospheric signal through the clutter.

In order to elucidate the non-standard techniques that are used herein, consider the following example. Expanding the region of interest, FIG. 16 illustrates what a typical spectra looks like with overlapping atmospheric return echo and clutter signals (dark; thick lines).

The standard method selects the peak of greatest magnitude, the clutter signal, as the starting point, then follows the signal down to the noise level (horizontal dashed line). These intersection points then define the cut-off radial velocities ($V_1$, $V_2$), and the moments would then be computed via Equation (7). This approach introduces errors in the moment calculations: overestimating the zero-th and second moments, and biasing the first moment towards the clutter signal. As the fuzzy logic feature detection method differentiates between the clutter and atmospheric return echo signals, these errors can be mitigated.

This process occurs in two steps. Starting from the mid-point of the atmospheric return echo signal feature, as in the standard method, an attempt is made to follow the signal down to the noise level. As seen in FIG. 16, this is successful on the right side of the signal, yielding the cut-off velocity $V_2$. However, following the atmospheric return echo signal down on the left hand side, a ground clutter feature is intersected before reaching the noise level. The feature detection method is not designed to find the precise extent of these features (this is the task at hand), hence a more accurate determination of the intersection point (P, in FIG. 16) is required. This can be accomplished using similar mathematical and fuzzy logic techniques as used above. The Point P is part of an "upside down" ridge line (or valley) parallel to the range axis. Once this intersection point is found, an extrapolation of the atmospheric return echo signal down to the noise level is performed as represented by the thin grey line extending from the left hand side of the atmospheric return echo signal. This results in the left hand cut-off velocity, $v_1$ as seen in FIG. 16. The moments are then computed via Equation (7). In this manner, the errors that result from computing the moments over the merged signals is avoided. This same methodology can be applied to overlapping (clear-air) atmospheric return echo, precipitation signals, and radio interference.

Continuity Checks

Once the first moments (radial velocities) are computed for each range, a final quality control procedure is performed: verifying the continuity of the moments as a function of range. While allowing for a natural range of variability over range, this step ensures that any outliers that passed through, or resulted from the antecedent processing steps, are removed. This continuity check utilizes a fuzzy logic approach, with interest fields generated by the chi-square value from local linear and quadratic least squares fits to the moments as a function of range. Another interest field is computed from the deviation of the given moment from a local median value. then an outlier is detected via this process, an interpolated value is used as a replacement moment If the outlier occurs near the edge (lowest or highest ranges) of the domain, an extrapolated value is used. A similar quality control process is applied to the second moments.

Unaveraged Spectral Processing: Point Target Removal

Most of the discussion above focussed upon increasing the accuracy of the Doppler moments by differentiating between the desired atmospheric return echo signal and unwanted contamination signals. Unfortunately there are contamination sources, such as aircraft, which cause such significant corruption of the atmospheric return echo signal at the averaged spectral level that the accuracy of these new methods can be compromised. It should be noted, that human experts have similar difficulties in identifying the atmospheric return echo signal submerged within aircraft contamination. Contamination sources which are the most intermittent show up at the unaveraged spectral level. The sources include aircraft, ground traffic (cars, etc.), birds, nonstationary wind fields and fast moving ships. The result of the contamination passes through the processing chain: contaminating the moment calculations and the wind estimates. Hence, depending on the level of the contamination, wind, wind shear and turbulence estimates are negatively affected.

Figure 17:
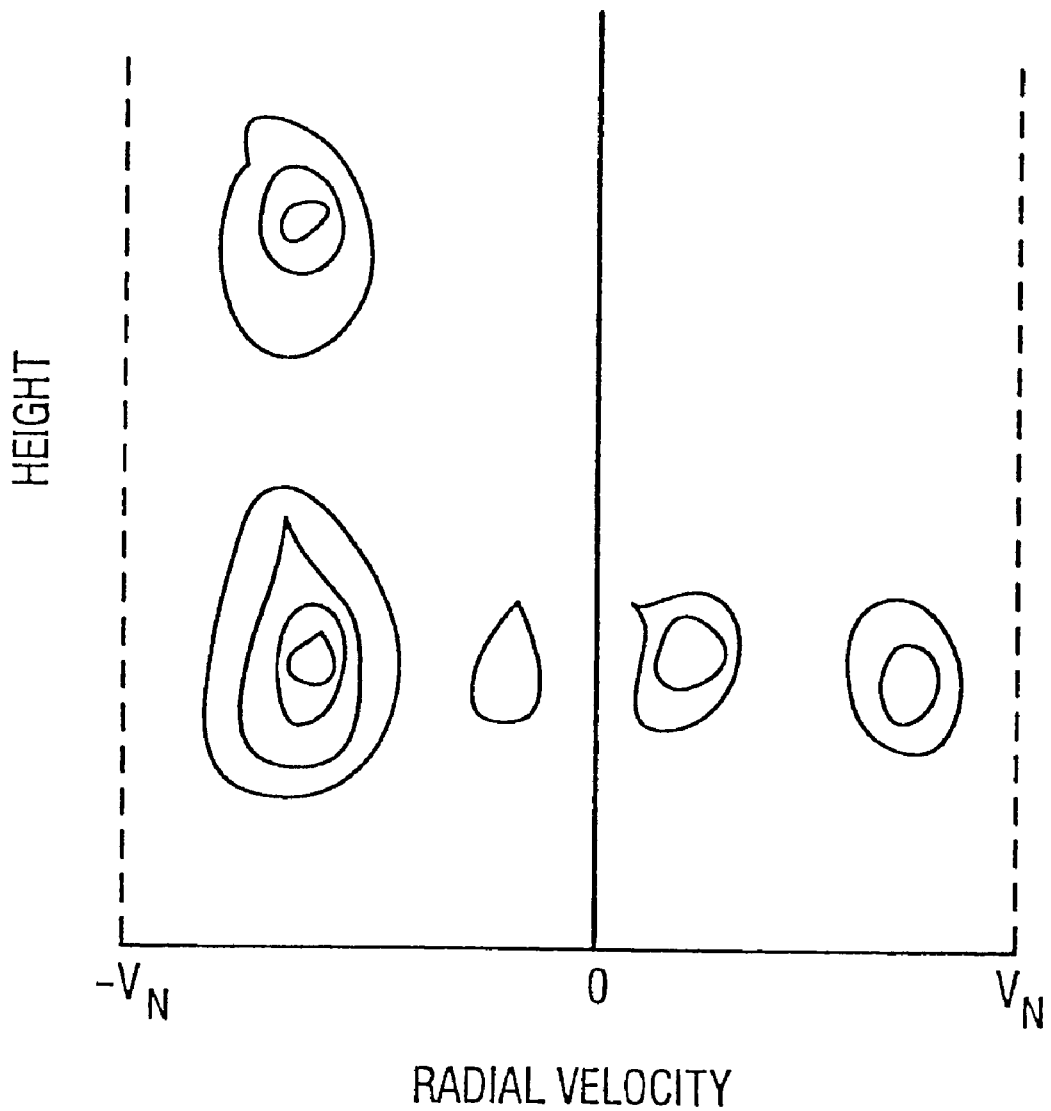
FIG. 17 illustrates an example of an aircraft signal in unaveraged spectra.

As described above and illustrated in FIG. 6 for a single range, an aircraft return in the unaveraged spectra tends to be a very large amplitude signal which, as a function of time, appears in random locations parallel to the velocity axis. When viewed in the unaveraged spectra, as a function of Doppler velocity and range, the aircraft signal may appear as in FIG. 17 with a contour threshold well above the noise level. The main return from the aircraft is seen in the lower left hand side of FIG. 17, with a ground reflection at the same velocity and twice the range. On the right hand side of the figure, at the same range as the main aircraft signal, are some other reflection-like signals which illustrate the effect of contamination at the receiver and signal processing level due to the large-amplitude aircraft return. These "bulls-eye" signals are relatively easy to identify using many of the techniques described above. The spectral values associated with these point targets are then excluded from the subsequent spectral averaging process.

Two Dimensional Least Squares Quadratic Analysis

In both the unaveraged and averaged spectral processing techniques, a local two dimensional least squares fit of the median filtered data to a quadratic surface is performed. Since the results of this analysis are referenced in many places below, the details are discussed in this subsection. The signal power is the data comprising the quadratic surface (denoted $g(x, y)$ where x is a coordinate along the radial velocity axis and y is along at the range axis). The quadratic surface is computed over all the points in a prescribed rectangle, centered at the point $(x_0, y_0)$. The quadratic surface is defined by:

$$g(xy)=a(x-x_0)^2+b(x-x_0)(y-y_0)+c(y-y_0)^2+d(x-x_0)+e(y-y_0)+f \quad (8)$$

where:

$$a = \frac{1}{2}\frac{\partial^2 g}{\partial x^2}\bigg|_{(x_0,y_0)} \quad b = \frac{\partial^2 g}{\partial x \partial y}\bigg|_{(x_0,y_0)} \quad c = \frac{1}{2}\frac{\partial^2 g}{\partial y^2}\bigg|_{(x_0,y_0)} \quad (9)$$

$$d = \frac{\partial g}{\partial x}\bigg|_{(x_0,y_0)} \quad e = \frac{\partial g}{\partial y}\bigg|_{(x_0,y_0)} \quad f = g(x_0, y_0)$$

In the application of this quadratic surface fit, various quantities are of interest, including the curvature along the coordinate axes (a or c) and the magnitude of the gradient vector:

$$|\nabla g(x_0, y_0)|=(d^2+e^2)^{1/2} \quad (10)$$

Locations which have very large gradients and/or curvature tend to be areas of data contamination, i.e., the location of a point target or ground clutter.

Local maxima in the radial velocity-range coordinate system are similarly of importance. As mentioned above, the atmospheric return echo signal tend to appear as a ridge line running generally parallel to the range axis. Points along the top of this ridge line have the property that the gradient vector is close to zero, i.e., d and e are close to zero. This implies that at such a point $(x_0, y_0)$,:

$$g(x_0, y_0) \approx Av \cdot v + f \quad (11)$$

where the matrix A and the vector v are defined by:

$$A = \begin{bmatrix} a & b/2 \\ b/2 & c \end{bmatrix}, \underline{v} = \begin{bmatrix} x - x_0 \\ y - y_0 \end{bmatrix} \quad (12)$$

In order for the point ($x_0$, $y_0$) to be a local maximum, the matrix A should be negative semi-definite:

$$A\underline{v}\cdot\underline{v} \leq 0, \text{ for all } \underline{v} \quad (13)$$

This implies that A should have negative eigenvalues:

$$\lambda_1 = \frac{1}{2}\left\{a + c + [(a+c)^2 - 4ac + b^2]^{\frac{1}{2}}\right\} \leq 0, \quad (14)$$

$$\lambda_2 = \frac{1}{2}\left\{a + c - [(a+c)^2 - 4ac + b^2]^{\frac{1}{2}}\right\} \leq 0.$$

These eigenvalues give the curvature along the direction of the largest and smallest change ($\lambda_2$, and $\lambda_1$, respectively) in the function g(x, y) at the point ($x_0$, $y_0$). These directions are given by the (unit) eigenvectors $v_1$, $v_2$ which are obtained via the solutions of:

Consider the first equation, $$(A - \lambda_1 I) \cdot \hat{\underline{v}}_1 = \begin{bmatrix} a - \lambda_1 & b/2 \\ b/2 & c - \lambda_1 \end{bmatrix}\begin{bmatrix} \xi_1 \\ \xi_2 \end{bmatrix} = 0 \quad (16)$$

Since by definition, det $|A-\lambda_r I|=0$, this system of equations is degenerate. Nevertheless a solution for the components $\xi_1$ and $\xi_2$ can be obtained as follows. Set $\xi_1$ to one, this implies that (from the first row of A), $\xi_2 = 2(\lambda_1 - a)/b$. The normalization value $\eta_1$ is given by:

$$\eta_1 = (\xi_1^2 + \xi_2^2)^{\frac{1}{2}} = (1 + \xi_2^2)^{\frac{1}{2}} \quad (17)$$

so that the first, normalized eigenvector is given by:

$$\hat{\underline{v}}_1 = \eta_1^{-1}\begin{bmatrix} \xi_1 \\ \xi_2 \end{bmatrix} = \left(\left[1 + \left(\frac{2}{b}(\lambda_1 - a)\right)^2\right]\right)^{-\frac{1}{2}}\left[\frac{2}{b}(\lambda_1 - a)\right] \quad (18)$$

Similarly the other eigenvector is given by:

$$\hat{\underline{v}}_2 = \left(\left[1 + \left(\frac{2}{b}(\lambda_2 - a)\right)^2\right]\right)^{-\frac{1}{2}}\left[\frac{2}{b}(\lambda_2 - a)\right] \quad (19)$$

In the unaveraged spectral processing, the features of interest are point targets which appear in the radial velocity-range-power (x,y,g) coordinate space as a high intensity, three-dimensional "bull's-eye." Near the top of this bull's-eye, both of the eigenvalues are large-negative and approximately equal in magnitude. Due to digital in filtering the radar receiver, in practice the bull's-eye is slightly elongated along the range axis.

In the averaged spectra, the features of interest are the locations of the atmospheric return echo signal, which appear as a "ridge-line" in the general direction of the range coordinate. For this situation, the directions corresponding to the two eigenvalues are: along the ridge-line for which $\lambda_1$ is small (negative or at least small positive); and perpendicular to the ridge-line for which $\lambda_2$ negative and larger in magnitude than $\lambda_1$.

With this ridge-line model, it is advantageous to weight the interest values associated with the eigenvalues by the projection of the associated eigenvectors onto the coordinate axes. That is, if the ridge-line went straight up along the range axis, the eigenvector associated with $\xi_1$ lies along the velocity axis. The reverse is true for the other eigenvector, it lies along the range axis. Of course, the wind field is not in general constant for all ranges, hence the eigenvectors are not always exactly coincident with the coordinate axes. Nevertheless, for realistic wind fields the directions of the eigenvectors should not be too far away from the appropriate axes. Therefore, the deviation of the eigenvectors from the appropriate axes can be used as a weighting factor for the interest value associated with eigenvalues. Specifically, the sine and cosine of $\hat{v}$ are used for weighing $\lambda_1$ and $\lambda_2$, respectively. (Recall that the eigenvectors are orthonormal to each other, hence either eigenvector gives all the needed information.) The (multiplicative) weights for $\lambda_1$ and $\lambda_2$ are respectively:

$$\min[1.0, |\sin(\hat{v})|+0.03], \min[1.0, |\cos(\hat{v})|+0.3]. \quad (20)$$

The additive factor of 0.3 is used to ensure that a zero weight is never applied to the eigenvalues. Such a case could occur in the presence of a very large, localized, (in range) wind shear, wherein the local ridge line may run along the velocity axis. The procedure described above is subsequently referred to as "vector-weighted."

Wavelet Analysis

A very powerful tool in the analysis of non-uniform data is the wavelet transform. In the quadratic least squares analysis described above, an a priori choice of spatial scale has been imposed. That is, the quadratic surface is fit to the data within a prescribed, fixed-sized rectangle. If the size of a given feature of interest is on the order of the size of the rectangle, then the quadratic fit will give the desired first and second derivative information. However if the scales of the feature are mismatched to the size of the rectangle, then the quadratic fit will not optimally analyze the feature. As the quadratic fit is global to the rectangle, the position of features which are smaller than the rectangle will not be well identified.

This problem could be overcome by using a number of differently sized rectangles and performing the least squares quadratic surface fit at each of these scales. This procedure is, however, computationally expensive and is still limited by the size of the rectangles. The continuous wavelet transform (CWT) solves this problem in a mathematically efficient and elegant manner. The two-dimensional CWT of a signal $f(\underline{x})$ is defined by, $$W[f(\underline{x})] = C_{104}^{-\frac{1}{2}} a^{-1} \int f(\underline{x}) \psi^*(a^{-1}r_{-\theta}(\underline{x}-\underline{b}))d\underline{x} \quad (21)$$

The * indicates complex conjugation. The wavelet basis function $\Psi$ is a dilated, translated, and rotated version of a so-called "mother wavelet;"

$$\Psi(\underline{x}) \rightarrow a^{-1}\Psi(a^{-1}r_{-\theta}(\underline{x}-\underline{b})) \quad (22)$$

The parameter a>0 is the dilation parameter, $\underline{b}=(b_x, b_y)$ is the translation vector, and $r_{-\theta}$ is a rotation operator defined by, $$r_\theta[\underline{x}] \equiv \begin{bmatrix} \cos\theta & -\sin\theta \\ \sin\theta & \cos\theta \end{bmatrix}\begin{bmatrix} x \\ y \end{bmatrix} \quad (23)$$

$C\Psi$ is a normalization constant given by, $$C_\psi = (2\pi)^{-2}\int |(\underline{k})|^{-2}|\psi(\underline{k})|^2 d\underline{k} \quad (23)$$

where $\Psi(\underline{k})$ is the Fourier transform of the wavelet basis function.

Application of the convolution theorem to Eq. (21) results in, $$W[f(\underline{x})] = \psi^{-\frac{1}{2}} a \int f(\underline{k}) \psi^*(ar_\theta(\underline{k})) e^{i\underline{k}} d\underline{k} \tag{25}$$

This version of the CWT indicates that the wavelet transform of the function $f(\underline{x})$ can also be obtained from the inverse Fourier transform of the product of the Fourier transforms of the function and the wavelet basis function. This form of the CWT is amenable to efficient calculation via the Fast Fourier Transform (FFT). A further increase in efficiency can be realized by taking the FFT's of the suitable discretized wavelet basis functions a prior. It is important to note that in this context, since the inverse Fourier transform of Eq. (25) is performed with a discrete FFT, the term "continuous" refers to the variation of the dilation and rotation parameters.

The application of the continuous wavelet transform to two-dimensional image analysis has been fairly limited. One of the problems with multidimensional wavelet analysis is the significant increase in the dimensionality of the resultant parameter space. For example, in one-dimensional Fourier analysis a signal is decomposed into harmonic components. In order to visualize the signal or its Fourier transform requires two dimensions: signal amplitude and position (or time), or transform amplitude and wavenumber (or frequency), respectively. The analysis of two-dimensional data results in an increase by one in the dimension of the phase space: signal amplitude and two position variables, and transform amplitude and two wavenumbers, for the signal and Fourier transform, respectively.

On the other hand, the phase space of the wavelet transform is twice as large as for the original signal. That is, to visualize the wavelet transform phase space for a one dimensional signal requires three dimensions: wavelet amplitude and two wavelet parameters (position and dilation). For a two dimensional signal, a five-dimensional visualization would be needed: wavelet amplitude as a function of four wavelet parameters (two position parameters, a dilation parameter and a rotation parameter). Hence one of the strengths of the wavelet transform is also one of its limiting factors in practical application: unfolding the data into a higher dimensional phase space. With the use of the fuzzy logic synthesis techniques described above, the use of multidimensional wavelets is facilitated. Of course this does not remove the visualization problem. However this does not present a problem for a fuzzy logic feature identification algorithm, such as the one described above.

Another factor that must be considered when using wavelets is the multitude of allowable basis functions. From the CWYT formula, Eq. (21), it can be seen that the wavelet transform amplitudes reflect how well the basis function (for a given set of dilation, translation, and rotation parameters) is correlated to the data. Hence, as there is a wide latitude in allowable wavelet basis functions, it is reasonable to choose one which "looks like" the features of interest. In the context of a fuzzy logic algorithm, a variety of wavelet basis functions could be used to analyze a given data set, each wavelet chosen to extract certain characteristics from the data.

A useful relationship in this context is, $$W\left[\frac{\partial^m f}{\partial x^m}\right] = (-1)^m \int f(x) \frac{\partial^m}{\partial x^m}[\psi^*(x)] dx \tag{26}$$

This equation indicates that with a single wavelet basis function, the CWT of the derivatives of the function can be evaluated in an efficient manner. A very important feature of Eq. (26) is that the derivatives of the function itself need not be evaluated, only the derivatives of the wavelet basis function. So that even if the function itself is discontinuous (or just noisy), as long as the basis function is chosen such that it's derivatives exist and are continuous, the CWT of the derivatives of the function can be evaluated. These derivatives are, of course, related to the quantities which were derived from the quadratic analysis described above, (cf. Eq. (8)). Hence, a single wavelet basis function, along with its first and second derivatives, can be used to extract mean, slope, and curvature information from the data. Furthermore, the CWT allows for these quantities to be computed at multiple spatial scales (varying the dilation parameter), and along different coordinate axes (varying the rotation parameter).

Figure 22:
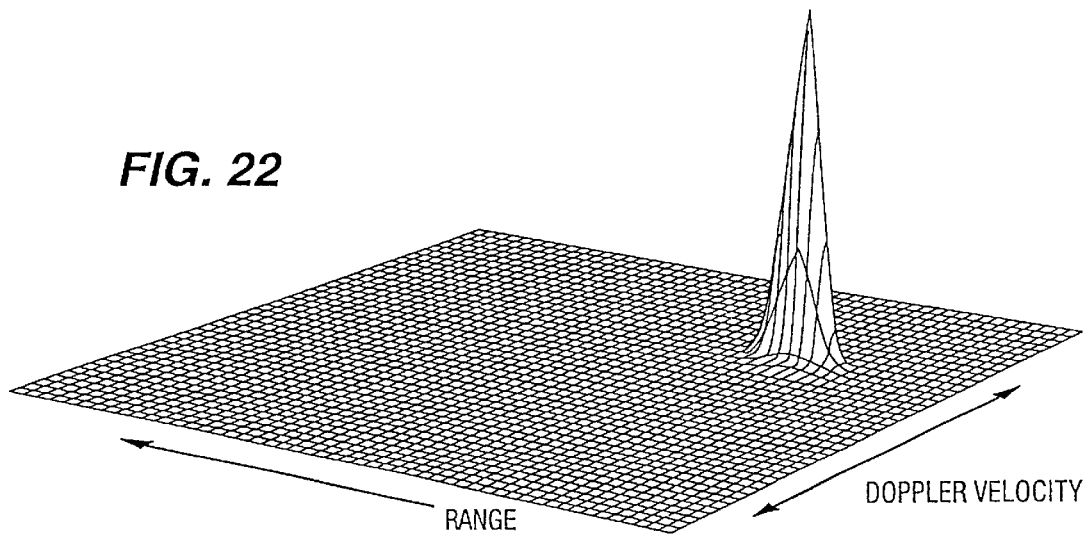
FIGS. 22–27 illustrate plots of signal power used to illustrate the wavelet analysis process.
Figure 23:
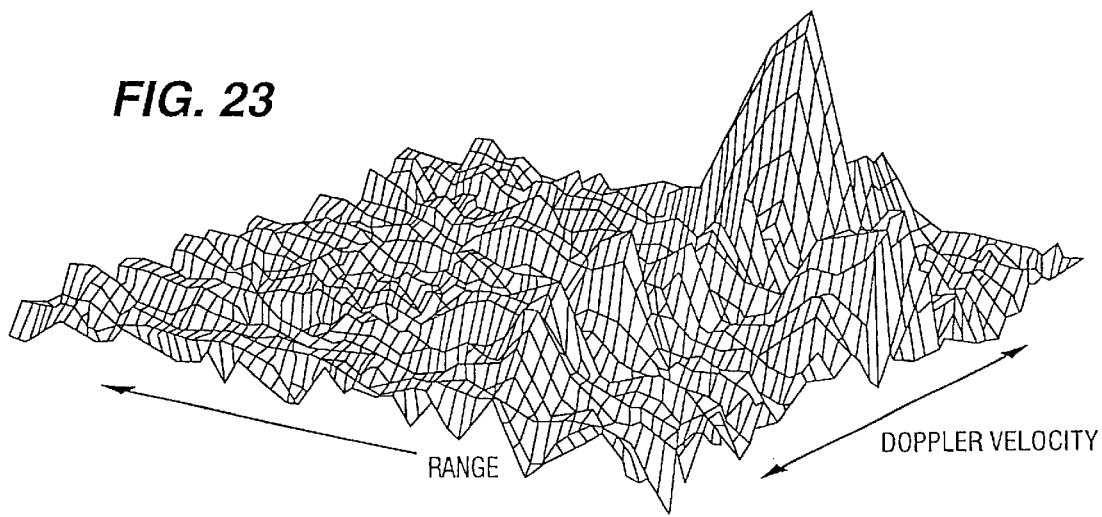
Figure 24:
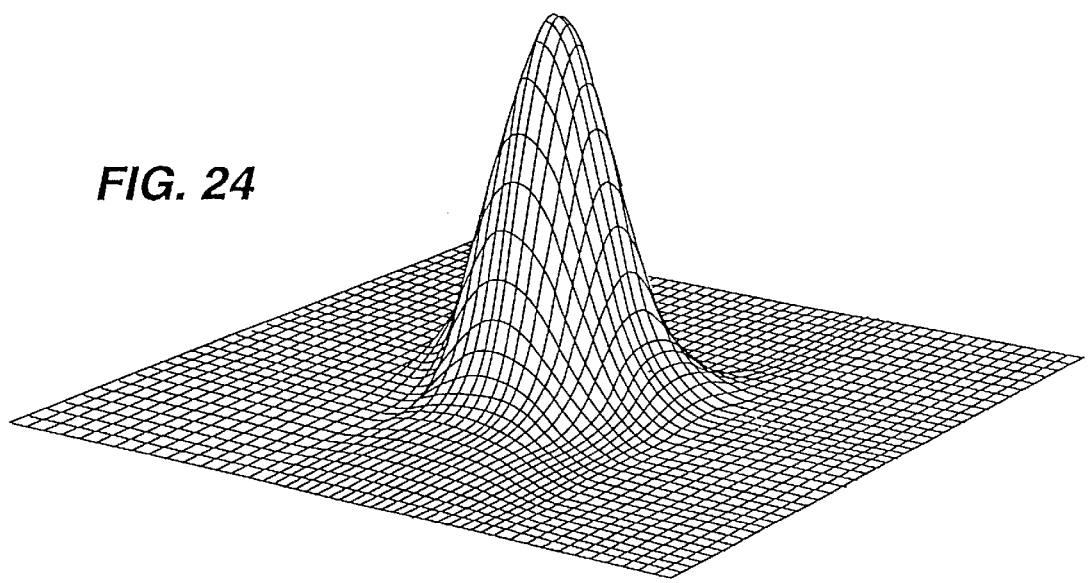

As a specific example of the concepts described above, consider the use of the CWT in the identification of aircraft contamination in unaveraged spectra. FIG. 22 and FIG. 23 illustrate in a mesh-plot format, the large-amplitude, discrete signal due to an aircraft. In the linear amplitude scaling (FIG. 22), the main return from the aircraft is quite visible. A careful examination of FIG. 23 (in dB scaling) reveals other, lower-amplitude artifacts from the aircraft contamination. These features, which are at the same range as the main return, are signal processing artifacts due to receiver saturation. Another subtle feature is the asymmetry in the aircraft signal as a function of range. his slight extension towards larger ranges is due to a Bessel function filter in the receiver.

As discussed above, it is desirable to use a wavelet basis which is well-matched to the signal and which is differentiable to at least second order. A wavelet basis which satisfies these criteria is the complex Morlet wavelet, defined by:

$$\Psi(\underline{x}) = \exp[i\underline{k}_0 \cdot \underline{x} - \tfrac{1}{2}(\underline{x} \cdot A\underline{x})] - \exp\{-\tfrac{1}{2}[\underline{k}_0 \cdot B\underline{k}_0 + \underline{x} \cdot A\underline{x}]\} \tag{27}$$

Where, $B = A^{-1}$. For the two dimensional analysis at hand, the following parameters are chosen, $$\underline{k}_0 = \begin{bmatrix} 0 \\ k_0 \end{bmatrix}, A = \begin{bmatrix} 1/\varepsilon & 0 \\ 0 & 1 \end{bmatrix} \tag{28}$$

Where, $k_0 = |\underline{k}|$ and $\epsilon$ is an anisotropy factor which stretches the wavelet along the x-axis. With these parameters, Eq. (27) is given by, $$\Psi(\underline{x}) = \exp\left[-\frac{1}{2}\left(\frac{x^2}{\varepsilon} + y^2\right)\right]\left\{\exp(ik_0 y) - \exp\left(-\frac{1}{2}k_0^2\right)\right\} \tag{29}$$

Recall that the dilated, rotated, and translated wavelet is given by $\Psi(\underline{x}) \to a^{-1} \Psi(a^{-1} r_{-\theta}(\underline{x} - \underline{b}))$. Defining, $\underline{x}' = a^{-1} r_{-\theta}(\underline{x} - \underline{b})$, Eq. (29), can be written as, $$\Psi(\underline{x}') = a^{-1}\exp\left[-\frac{1}{2}\left(\frac{x'^2}{\varepsilon} + y'^2\right)\right]\left\{\exp(ik_0 y') - \exp\left(-\frac{1}{2}k_0^2\right)\right\} \quad (30)$$

In this form, it is clear how $\epsilon > 1$ acts to elongate the wavelet in the x' direction. If $k_0$ is large enough ($\geq 5.5$), then the last term in Eq. (30) is negligible. The Morlet wavelet is then a modulated, stretched, two-dimensional Gaussian function. The modulus of the wavelet is just a stretched Gaussian.

It is straightforward to show that the following relations hold, $$\frac{\partial}{\partial x'}\Psi^*(\underline{x}') = \frac{x'}{\varepsilon}\Psi^*(\underline{x}'), \quad \frac{\partial^2}{\partial x'^2}\Psi^*(\underline{x}') = \varepsilon^{-2}(x'^2 - \varepsilon)\Psi^*(\underline{x}') \quad (31)$$

$$\frac{\partial}{\partial y'}\Psi^*(\underline{x}') = -y'\Psi^*(\underline{x}') + ia^{-1}k_0\exp\left[-\left(\frac{x'^2}{2\varepsilon} + \frac{y'^2}{2} + ik_0 y'\right)\right]$$

$$\frac{\partial}{\partial y'^2}\Psi^*(\underline{x}') =$$

$$(1 - y'^2)\Psi^*(\underline{x}') + a^{-1}k_0(k_0 - 2iy)\exp\left[-\left(\frac{x'^2}{2\varepsilon} + \frac{y'^2}{2} + ik_0 y'\right)\right]$$

$$\frac{\partial}{\partial y'\partial x'}\Psi^*(\underline{x}') = \frac{x'y'}{\partial} - \frac{ia^{-1}k_0}{\partial}x'\exp\left[-\left(\frac{x'^2}{2\varepsilon} + \frac{y'^2}{2} + ik_0 y'\right)\right]$$

Figure 25:
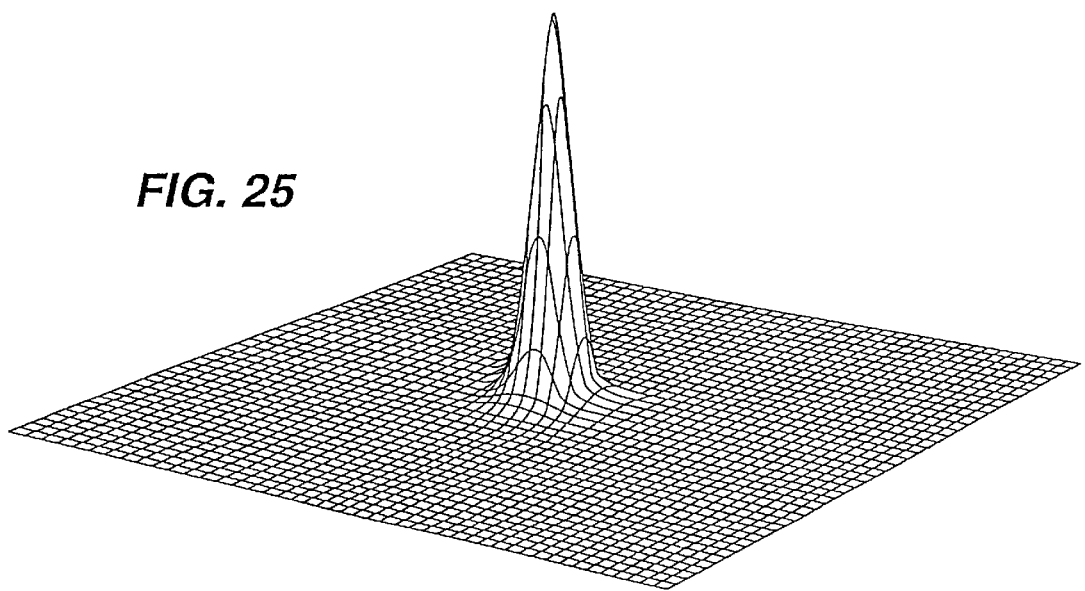
Figure 26:
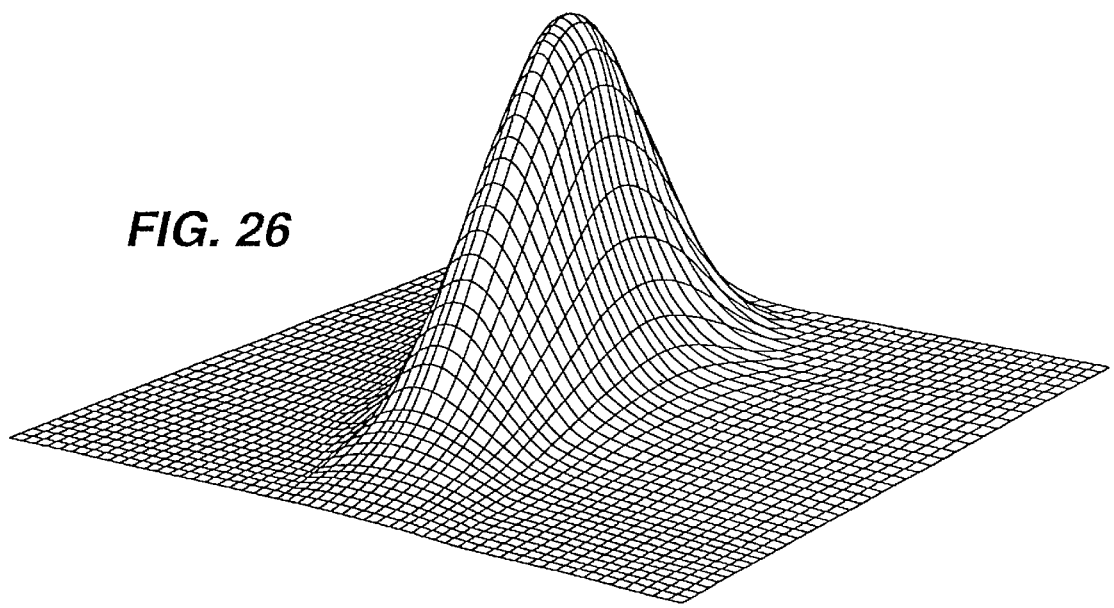
Figure 27:
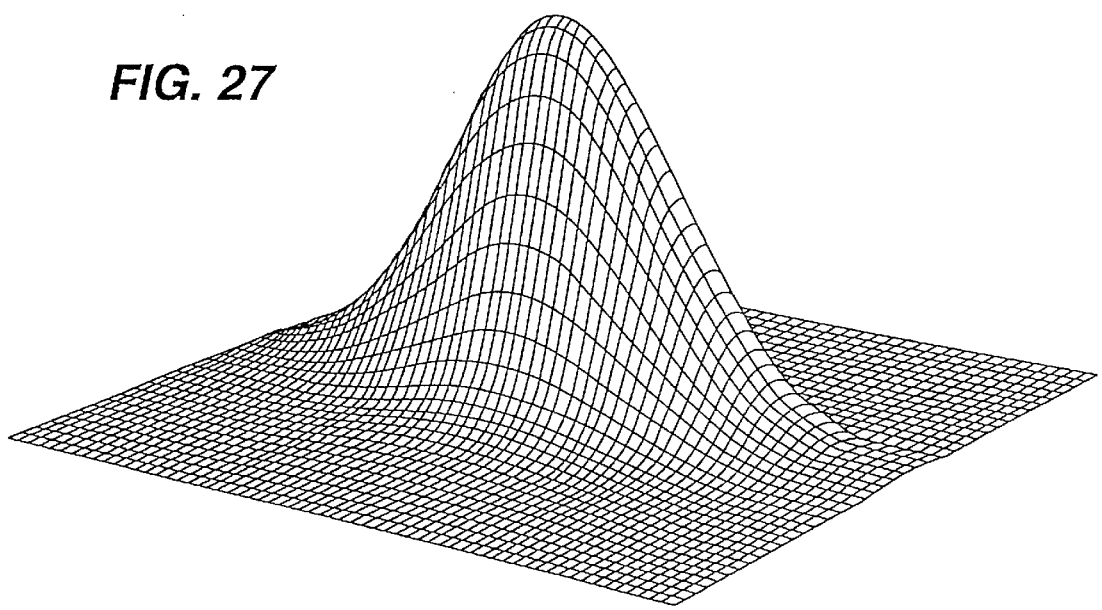

FIG. 24 through FIG. 27 illustrate some of the characteristics of the modulus of the Morlet wavelet. Each of these wavelets is centered at (0,0) (i.e., $\underline{b}=(0,0)$), and has $k_0$ large enough so that the last term in Eq. (30) is negligible. The first figure shows the modulus of the wavelet, centered at (0,0), with a moderate dilation factor, and with an anisotropy factor $\epsilon=1$, so as to make the wavelet symmetric. FIG. 25, is the same wavelet except the dilation factor has been reduced. FIG. 26 illustrates the effect of increasing the anisotropy factor, elongating the wavelet along the x-axis ($\theta=0°$). The last figure is the same as FIG. 26, though rotated 90°.

From these figures it is easy to see that the modulus of the Morlet wavelet is appropriate for the analysis of the aircraft contamination problem. Based on empirical testing, a small set of wavelet parameters can be selected so as to maximize the computational efficiency. For the identification of other, more complex features, a sufficiently general suite of wavelet analyses is used, including a larger parameter set (more dilations, rotations, etc.) And the use of the wavelet derivatives. However, for either case, a fuzzy logic algorithm is constructed to combine the various wavelet amplitudes as part of the feature identification algorithm.

Density Weighting

Another image processing technique which is used in both the unaveraged and averaged spectral processing is density weighting. This procedure is used to "sharpen" features by weighting each point by the (normalized) number of neighboring points whose total interest value are above a specified threshold. This technique does a good job of removing lower-intensity points on the boundary of a feature by weighting their original values by numbers less than one. For a point well-within a high intensity feature, its weighing factor is unity, so that its original value is unaffected. As an example, assume that set of neighborhood points is defined by a 3×3 point square, with the central point contained therein the one to be weighted. If the total-interest values at 4 of these points are above the threshold, then the normalized weighting factor is 4/9, which is then multiplied into the original total-interest value for the central point. Mathematically, this can be codified for a general n×m rectangle with p points above the threshold. If the original value at the central point is V, then it's density weighted value is VP/nm.

Technical Description: Processing at the Unaveraged Spectral Level

Two optional algorithms are described below: "full domain" and "sub-domain" processing. Where "domain" refers to the radial velocity-altitude coordinate system. The rational behind offering two methods lies in computational efficiency, the former method is more accurate yet computationally expensive, while the latter is more efficient though somewhat less accurate. When performed on every "sub-rectangle" of the radial velocity-altitude coordinate space, the two-dimensional least squares quadratic fit can be computationally expensive. In the sub-domain method, a "pre-filter" step is performed to identify those regions in the full domain where an aircraft signal may be located. The least squares or wavelet analysis is then applied solely to those areas. The pre-filter step utilizes a two-dimensional clumping algorithm to identify regions with large-amplitude signals, which are candidate locations of aircraft contamination. The least squares or wavelet analysis and fuzzy logic techniques are then applied to these candidate regions to positively identify the aircraft signal regions, both the main signal and reflections.

In the subsequent sections, the terminology "normalized" appears in a number of places. Generically, this term refers to dividing a given quantity at a radial velocity-altitude location by the maximum of these quantities at that height. For example, normalizing the eigenvalue $\lambda_2$ at a radial velocity-altitude location would be accomplished by dividing it by the maximum of all of the $\lambda_2$'s at that altitude.

Full-domain processing

Figure 18:
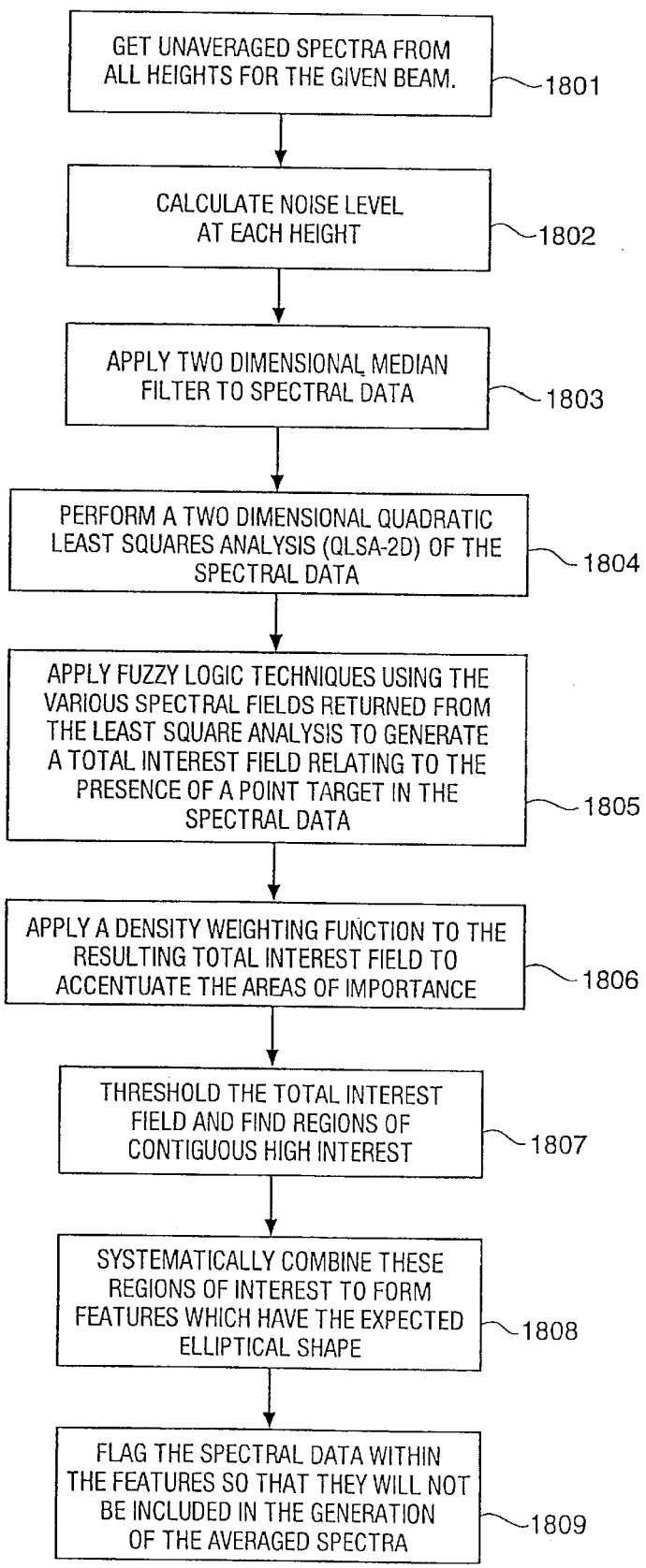
FIG. 18 illustrates in flow diagram form the processing of the unaveraged spectra to address the presence of intermittent noise sources.

This algorithm, disclosed in flow diagram form in FIG. 18, is applied to unaveraged Doppler spectra to remove points from the spectra which are contaminated by point targets such as aircraft. The following process is performed on all the range-gated unaveraged spectra from a given beam. The general concept relies on the fact that these point targets appear in the Doppler velocity-range-power coordinate space as a high intensity, three-dimensional "bull's-eye." Once these features are identified, they are isolated from the rest of the data, they are not included in the subsequent generation of the averaged spectra. The steps in this procedure are:

(1801) Get unaveraged spectra from all ranges for the given beam.

(1802) Calculate noise level at each range using a method based on the Hildebrand and Sekhon method.

(1803) Apply two dimensional median filter to spectral data.

(1804) Perform a two dimensional quadratic least squares analysis (QLSA-2d) or wavelet analysis of the spectral data. The analysis is performed at each spectral point using that point and surrounding points included in a fixed box size. This analysis is performed on a variety of spectral scalings, linear and dB.

(1805) Apply fuzzy logic techniques using the various spectral fields returned from the least square or wavelet analysis to generate a total interest field relating to the presence of a point target in the spectral data.

The data fields used in this fuzzy logic application are as follows:

a) Magnitude of the gradient vector from QLSA-2d of the dB scaled spectral data.
 b) Magnitude of the gradient vector from QLSA-2d of the linearly scaled spectral data.

c) Ratio of $\lambda_2$ to $\lambda_2$ from QISA-2d of the dB scaled spectral data.
d) $\lambda_2$ from QLSA-2d of the dB scaled spectral data.
e) $\lambda_2$ from QLSA-2d of the linearly scaled spectral data.
f) $\lambda_1$ from QLSA-2d of the dB scaled spectral data.
g) $\lambda_1$ from QLSA-2d of the linearly scaled spectral data.
h) Normalized difference between the spectral intensity values of points equidistant from zero velocity.

(1806) Apply a density weighting function to the resulting total interest field to accentuate the areas of importance.

(1807) Threshold the total interest field and find regions of contiguous high interest.

(1808) Systematically combine these regions of interest to form features which have the expected elliptical shape.

(1809) Flag the spectral data within the features so that they are not included in the generation of the averaged spectra.

Once the stronger aircraft features are found via these steps, they can be used to search for weaker aircraft "reflection" signals. That is, search for a ground reflection signal at twice the altitude or a saturation signal symmetrically located around zero velocity. Similar techniques can be applied to remove other contaminates from the unaveraged spectra, such as bird contamination and RFI.

Sub Domain Processing

Figure 19A:
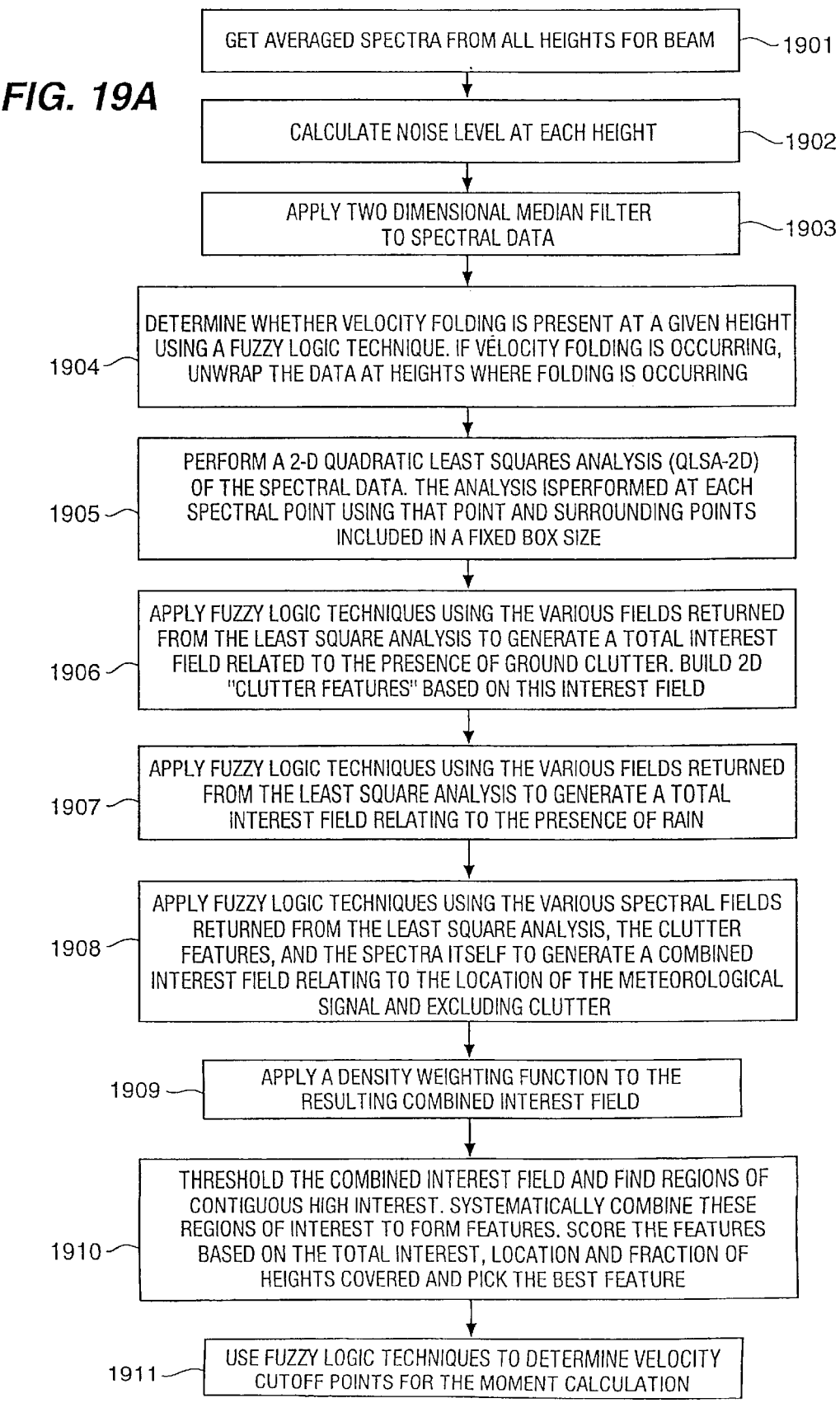
FIGS. 19A and 19B illustrate in flow diagram form the processing of the averaged spectra to address the presence of continuous noise sources.
Figure 19B:
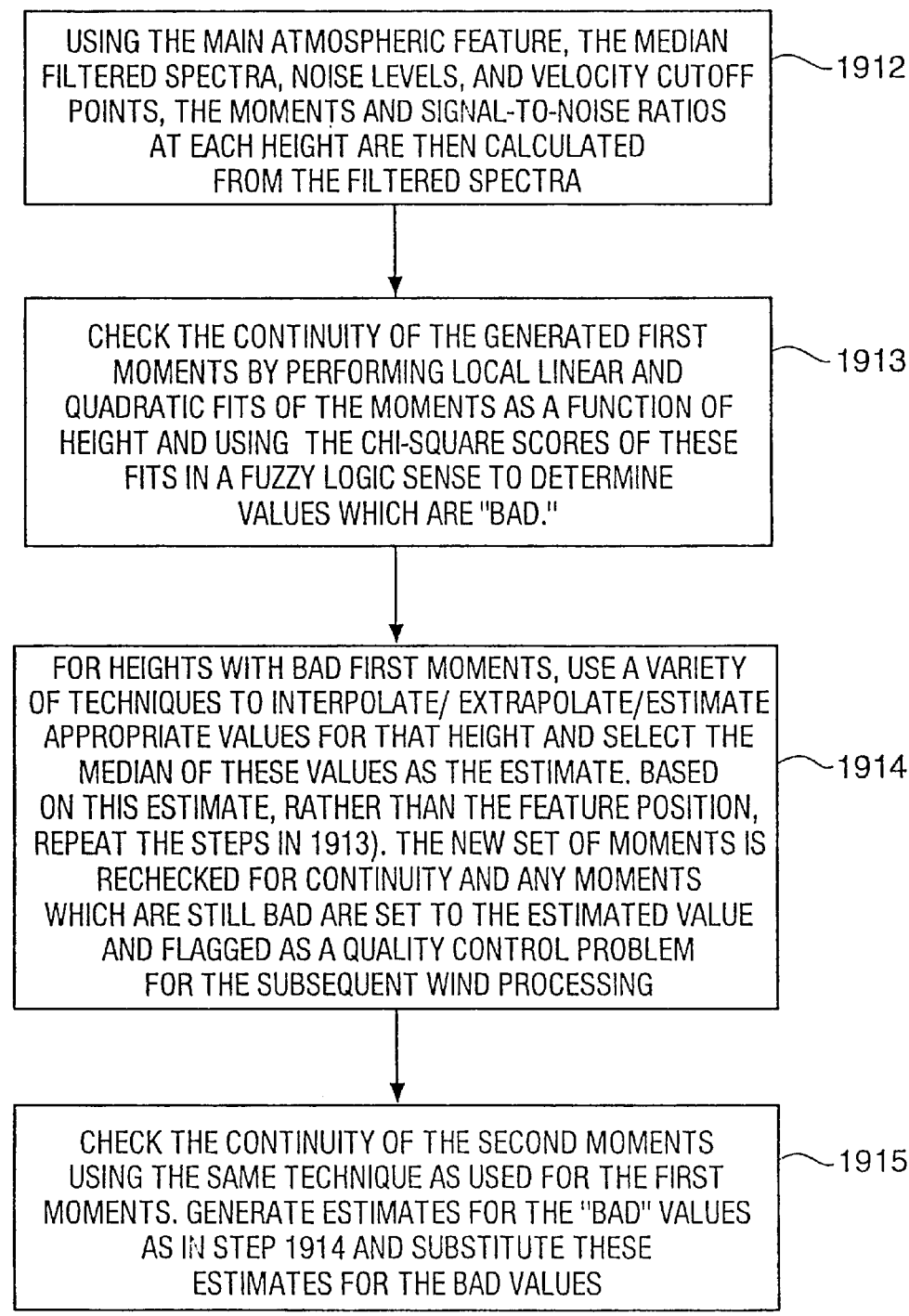
Figure 20:
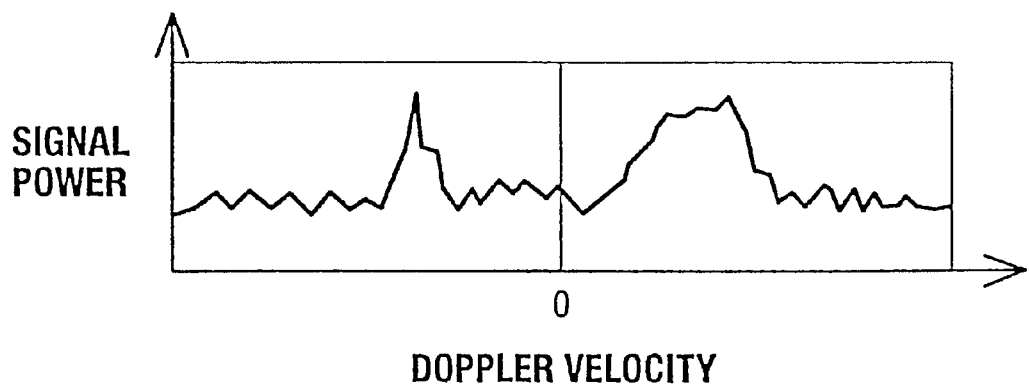
FIG. 20 illustrates a plot of Doppler velocity against signal power.
Figure 21:
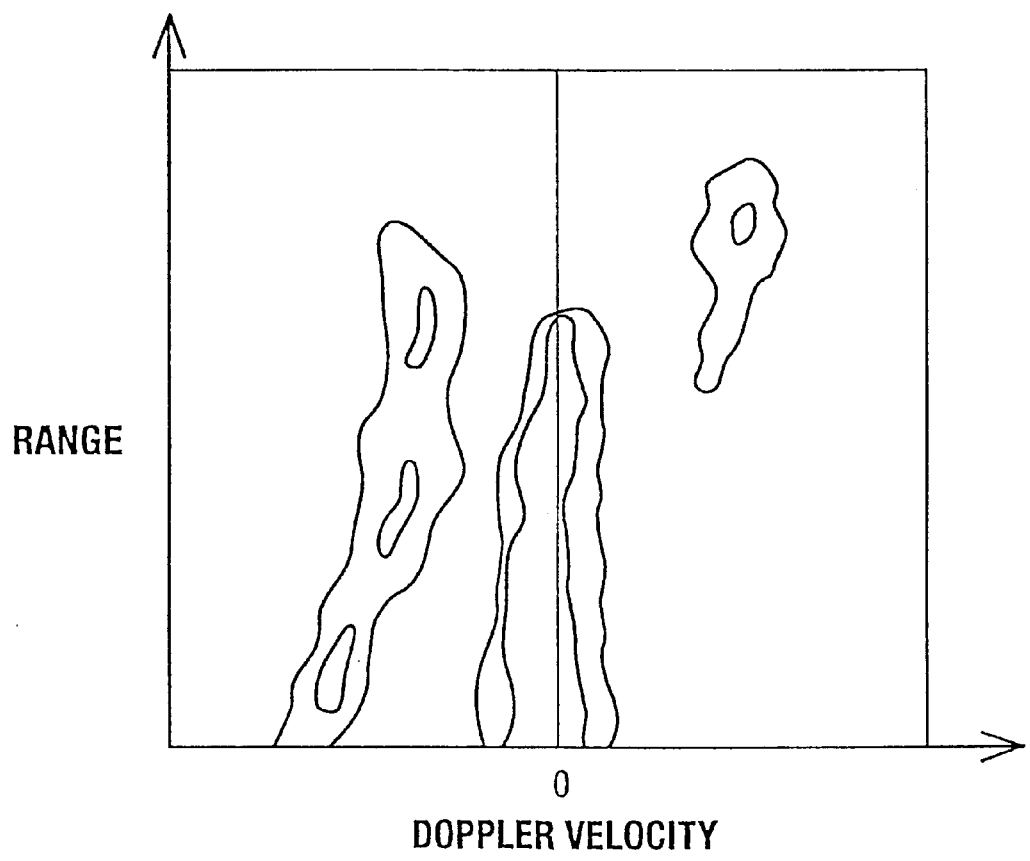
FIG. 21 illustrates a plot of signal power contour lines on a plot of Doppler velocity against signal power.

In this, more efficient implementation, a pre-processing step, as disclosed in flow diagram form in FIGS. 19A and 19B, is performed before using the quadratic least squares or wavelet analysis. (1) Get unaveraged spectra from all altitudes for the given beam. (2) Apply two-dimensional clumping algorithm to determine regions which may contain an aircraft signal. (3) For the candidate aircraft-contaminated regions, apply steps (1803–1809) from the full-domain processing algorithm, above.

As above, a search for weaker "reflection" signals can then be performed.

Technical Description: Processing at the Averaged Spectral Level

In the previous section, a description is given of a quality control processing algorithm at the unaveraged spectral level which is capable of removing contamination from highly intermittent sources. In this manner, the resulting averaged spectra are less affected by these contamination sources. However, as discussed above, many other contamination sources exist and they need to be addressed at the averaged spectral level. Inaccurate moment estimates due to these continuous contamination sources affect the subsequent wind, wind shear and turbulence calculations. The general processing concepts: mathematical analysis, fuzzy logic and image processing, were discussed above. In the following, a detailed description of the algorithm is presented.

(1901) Get averaged spectra from all altitudes for beam.

(1902) Calculate noise level at each altitude using a method based oil the Hildebrand and Sekhon method.

(1903) Apply two dimensional median filter to spectral data.

(1904) Determine whether velocity folding is present at a given altitude using a fuzzy logic technique. If velocity folding is occurring, unwrap the data at altitudes where folding is occurring. The data fields used in this fuzzy logic calculation consist of the following:

(a) Relative altitude of the endpoints above noise level: (where is the spectral power at an end point "i" and N is the noise level for the given altitude).

(b) Normalized difference between endpoint spectral densities: where and are the spectral endpoint power levels.

(c) Noise level, N.

(1905) Perform a 2-d quadratic least squares analysis (QLSA-2d) or wavelet analysis of the spectral data. The analysis is performed at each spectral point using) that point and surrounding points included in a fixed box size. This analysis is performed on a variety of spectral scalings, e.g., linear and dB power. This analysis may also be performed on a variety of box sizes.

(1906) Apply fuzzy logic techniques using the various fields returned from the least square or wavelet analysis to generate a total interest field related to the presence of ground clutter. Build 2d "clutter features" based on this interest field. The data fields used in this fuzzy logic application are as follows:

(a) $\lambda_2$ from QLSA-2d of the dB scaled spectral data.
(b) $\lambda_2$ from QLSA-2d of the linearly scaled spectral data.
(c) Magnitude of the gradient vector from QLSA-2d of the dB scaled spectral data.
(d) Velocity value. (Ground clutter contamination is expected to be near zero velocity, so that proximity to zero velocity is a useful interest field.)
(e) Curvature (1907) Apply fuzzy logic techniques using the various fields returned from the least square analysis to generate a total interest field relating to the presence of rain. Build 2d rain features based on this interest field. The data fields used in this fuzzy logic application are as follows:

(a) Velocity value.
(b) Vector-weighted $\lambda_2$ from QLSA-2d of the dB scaled spectral data.
(c) Vector-weighted $\lambda_1$ from QLSA-2d of the dB scaled spectral clata.
(d) Vector-weighted $\lambda_2$ from QLSA-2d of the linearly scaled spectral data.
(e) Vector-weighted $\lambda_1$ from QLSA-2d of the linearly scaled spectral data.
(f) Vector-weighted and normalized $\lambda_2$ from QISA-2d of the linearly scaled spectral data.
(g) Vector-weighted and normalized $\lambda_1$ from QLSA-2d of the linearly scaled spectral data.
(h) Normalized difference between the spectral intensity values of the points symmetrically placed around zero velocity.
(i) Magnitude of the gradient vector from QLSA-2d of the dB scaled spectral data.
(j) The curvature along the velocity axis from QLSA-2d of the dB scaled spectral data.
(k) Ratio of the spectral intensity at a given velocity-altitude point to the noise level at the altitude.

(1908) Apply fuzzy logic techniques using the various spectral fields returned from the least square or wavelet analysis, the clutter features, and the spectra itself to generate a combined interest field relating to the location of the meteorological signal and excluding clutter. The data fields used in this fizzy logic application are as follows:

(a) Vector-weighted $\lambda_2$ from QLSA-2d of the dB scaled spectral data.
(b) Vector-weighted $\lambda_1$ from QLSA-2d of the dB scaled spectral data.
(c) Vector-weighted $\lambda_2$ from QLSA-2d of the linearly scaled spectral data.
(d) Vector-weighted $\lambda_1$ from QLSA-2d of the linearly scaled spectral data.

(e) Vector-weighted and normalized $\lambda_2$ from QLSA-2d of the linearly scaled spectral data.

(f) Vector-weighted and normalized $\lambda_1$ from QLSA-2d of the linearly scaled spectral data.

(g) Normalized difference between the spectral intensity values of the points symmetrically placed around zero velocity.

(h) Normalized difference between the spectral intensity values of the points in the given beam and their corresponding points in the previous beam whose direction was 180 degrees different.

(i) Magnitude of the gradient vector from QLSA-2d of the dB scaled spectral data.

(j) The curvature along the velocity axis from QLSA-2d of the dB scaled spectral data.

(k) Presence of a clutter feature at the point.

(l) Ratio of the spectral intensity at a given velocity-altitude point to the noise level for the altitude.

(m) Normalized magnitude of the gradient vector from QLSA-2d of the dB scaled spectral data.

(n) Ratio of $\lambda_2$ to $\lambda_1$ from QLSA-2d of the dB scaled spectral data.

(o) The value (including sign) of the eigenvalue ($\lambda_1$ or $\lambda_2$) whose magnitude is larger.

(p) The normalized value (including sign) of the eigenvalue ($\lambda_1$ or $\lambda_2$) whose magnitude is larger.

(1909) Apply a density weighting function to the resulting combined interest field.

(1910) Threshold the combined interest field and find regions of contiguous high interest. Systematically combine these regions of interest to form features. Score the features based on the total interest, location and fraction of altitudes covered and pick the best feature.

(1911) Use fuzzy logic techniques to determine velocity cutoff points for the moment calculation. The data fields used in this fuzzy logic application are as follows:

(a) The presence of the main atmospheric feature.

(b) The presence of another "atmospheric-looking" feature.

(c) The total interest value.

(d) The presence of a ground clutter feature.

(e) A combined metric based on the curvature and the square of the slope along the velocity axis.

(f) A normalized, combined metric based on the curvature and the square of the slope along the velocity axis.

(g) The presence of a maxima/minima in the curvature along the velocity axis from the QLSA-2d of the dB scaled spectral data.

(h) The presence of a maxima/minima in the curvature along the velocity axis from the QLSA-2d of the linearly scaled spectral data.

(i) The curvature along the velocity axis from QLSA-2d of the dB scaled spectral data.

(j) The curvature along the velocity axis from QLSA-2d of the linearly scaled spectral data.

(k) The square of the slope along the velocity axis from QLSA-2d of the dB scaled spectral data.

(1912) Using the main atmospheric feature, the median filtered spectra, noise levels, and velocity cutoff points, the moments and signal-to-noise ratios at each range are then calculated from the filtered spectra.

(1913) Check the continuity of the generated first moments by performing local linear and quadratic fits of the moments as a function of altitude and using the chisquare scores of these fits in a fuzzy logic sense to determine values which are "bad." The data fields used in this fuzzy logic application are as follows:

(a) Chi-square score from linear fit.

(b) Chi-square score from quadratic fit.

(c) Difference of the test moment from the median value moment (computed from the local set of ranges).

(1914) For altitudes with bad first moments, use a variety of technique; to interpolate/extrapolate/estimate appropriate values for that altitude and select the median of these values as the estimate. Based on this estimate, rather than the feature position, repeat the steps in (1915) The new set of moments is rechecked for continuity and any moments which are still bad are set to the estimated value and flagged as a quality control problem for the subsequent wind processing.

(1916) Check the continuity of the second moments using the same technique as used for the first moments. Generate estimates for the "bad" values as in step (1914) and substitute these estimates for the bad values.

SUMMARY

The computation system of the present invention comprises an improved method of moment estimation for devices which measure spectra as a function of range or time. The preferred embodiment of this system is illustrated as part of an automated meteorological monitoring system for the accurate real time detection of meteorological phenomena, such as winds, wind shear and turbulence. This automated meteorological monitoring system uses a standard weather radar transmitter to scan a predetermined volume of space with a stream of radar pulses to determine the characteristics of meteorological phenomena that are extant in the predetermined volume. The computation system of the present invention utilizes novel signal processing algorithms in the improved method of moment estimation to excise the valid data from the return echoes, which are corrupted by the presence of contaminating signals. Separating the valid data from the noise in this manner improves the responsiveness and accuracy of the system in which this method is implemented.

The only way to accomplish this is, depending on the specific contamination source, to process the data at the unaveraged spectra, and averaged spectra level. Two quite different applications of this methodology are utilized in processing the Doppler spectra: (1) removing the contamination from intermittent point targets at the unaveraged spectral level, and (2) extracting the atmospheric return echo signal from the averaged spectra. These two problems are almost exact opposites. In the former case, the data contaminant is the desired feature that is to be isolated and removed, whereas in the latter situation the atmospheric return echo signal is to be extracted from the data contaminants. Nevertheless, the basic processing algorithms for these disparate applications are the same, the differences residing in implementation specifics.

We claim:

1. In a Doppler system that transmits a train of pulses of radio frequency energy into a predefined region of multidimensional space and receives return echo signals from scatters extant in said predefined region of space in response thereto, which return echo signals include at least one feature of interest and contaminating components, apparatus for mitigating the effects of said contaminating components comprising:

means for processing said spectral data to determine at least one mathematical quantity of said spectral data, comprising;
  means for mapping said return echo signals into Doppler velocity-range coordinated space;
  means for segmenting said Doppler velocity-range coordinate space into a plurality of sub-regions;
  means for computing at least one mathematical quantity based upon said received return echo signals for each of said plurality of sub-regions;
means for fuzzy logic analyzing said determined at least one mathematical quantity to produce local composite data for a plurality of sub-regions;
means for image processing said local composite data to extract said at least one feature of interest from said local composite data; and
means for extracting desired measurement data from said at least one feature of interest.

2. The apparatus of claim 1 wherein said means for processing comprises:
  means for processing said spectral data to identify at least one of said contaminating components using at least one of unaveraged spectral data, and averaged spectral data.

3. The apparatus of claim 2 wherein said fuzzy logic analyzing means comprises:
  means for identifying at least one pattern from said at least one mathematical quantity.

4. The apparatus of claim 3 wherein said means for extracting comprises:
  means for synthesizing a global feature from a plurality of said patterns.

5. The apparatus of claim 4 wherein said means for extracting further comprises:
  means for determining at least one data value from said synthesized global feature.

6. The apparatus of claim 1 wherein said means for producing computes at least one of slope and curvature of said Doppler data in said Doppler velocity-range coordinate space.

7. The apparatus of claim 1 further comprising:
  means for iteratively activating said means for processing, said means for fuzzy, logic analyzing, and said means for extracting in sequence, first on unaveraged spectra comprising said return echo signals and secondly said averaged spectra produced by said means for computing, said means for processing, and said means for extracting operating on said unaveraged spectra.

8. In a Doppler system that transmits a train of pulses of radio frequency energy into a predefined region of multidimensional space and receives return echo signals from scatterers extant in said predefined region of space in response thereto, which return echo signals include contaminating components, apparatus for mitigating the effects of said contaminating components in characterizing the motion of said scatterers using said received return echo signals comprising:
  means for mapping said return echo signals into a Doppler velocity-range coordinate space;
  means for segmenting said Doppler velocity-range coordinate space into a plurality of sub-regions;
  means for computing at least one mathematical quantity based upon said received return echo signals for each of said plurality of sub-regions;
  means for processing a plurality of said mathematical quantities to obtain a composite likelihood value for a plurality of sub-regions;
  means for image processing said composite likelihood values to extract said at least one feature from said local composite data; and
  means for extracting the desired measurement data from a plurality of said at least one feature.

9. The apparatus of claim 8 further comprising:
  means for iteratively activating said means for computing, said means for processing and said means for extracting in sequence, first on unaveraged spectra comprising said received return echo signals and secondly averaged spectra produced by said means for computing, said means for processing and said means for extracting operating on said unaveraged spectra.

10. The apparatus of claim 8 wherein said means for extracting comprises:
  means for synthesizing a global feature from a plurality of said composite likelihood values.

11. The apparatus of claim 10 wherein said plurality of composite likelihood values are computed for contiguous ones of said plurality of segments.

12. The apparatus of claim 10 wherein said means for extracting further comprises:
  means for determining at least one data value from said extracted feature.

13. The apparatus of claim 8 wherein said means for computing comprises:
  means for associating ones of said received return echoes with associated ones of said segments from which said received return echo originated; and
  means for processing a plurality of received return echoes for each segment to obtain said at least one mathematical quantity.

14. The apparatus of claim 13 wherein said means for processing computes at least one of slope and curvature of said Doppler velocity-range coordinate.

* * * * *

UNITED STATES PATENT AND TRADEMARK OFFICE
CERTIFICATE OF CORRECTION

PATENT NO. : 6,307,500 B1  
DATED : October 23, 2001  
INVENTOR(S) : Lawrence Bruce Cornman, Corinne Sue Morse and Robert Kent Goodrich It is certified that error appears in the above-identified patent and that said Letters Patent is hereby corrected as shown below:

<u>Title page,</u>
Insert the following -- Related U.S. Application Data,
[63] Divisional of application No. 08/618,192, March 19, 1996, Pat. No. 5,940,523. --

Signed and Sealed this

Fourth Day of February, 2003

JAMES E. ROGAN
*Director of the United States Patent and Trademark Office*